US012574433B2

(12) United States Patent
Filitz et al.

(10) Patent No.: US 12,574,433 B2
(45) Date of Patent: Mar. 10, 2026

(54) DOCUMENT TEMPLATING SYSTEM FOR DISTRIBUTED, SELF-SOVEREIGN CONTENT SHARING

(71) Applicant: SAP SE, Walldorf (DE)

(72) Inventors: Gianluca Filitz, Potsdam (DE); Frank Feinbube, Potsdam (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/544,871

(22) Filed: Dec. 19, 2023

(65) Prior Publication Data

US 2025/0202967 A1     Jun. 19, 2025

(51) Int. Cl.
*H04L 67/06* (2022.01)
*G06F 40/106* (2020.01)
*G06F 40/186* (2020.01)

(52) U.S. Cl.
CPC ............ *H04L 67/06* (2013.01); *G06F 40/106* (2020.01); *G06F 40/186* (2020.01)

(58) Field of Classification Search
CPC ....... H04L 67/06; G06F 40/106; G06F 40/186
See application file for complete search history.

(56) References Cited

U.S. PATENT DOCUMENTS

| | | | | |
|---|---|---|---|---|
| 7,284,203 | B1 * | 10/2007 | Meeks .................. | G06Q 10/10 |
| | | | | 709/204 |
| 8,849,759 | B2 | 9/2014 | Bestler et al. | |
| 8,881,257 | B2 | 11/2014 | Cha et al. | |
| 9,049,176 | B2 | 6/2015 | Ferdowsi et al. | |
| 10,552,796 | B1 * | 2/2020 | Delacourt ............ | G06Q 10/103 |
| 10,594,774 | B2 | 3/2020 | Thomas | |
| 10,812,627 | B2 | 10/2020 | Berg et al. | |
| 11,119,649 | B1 * | 9/2021 | Sahgal ................... | G06F 16/93 |
| 11,159,510 | B2 | 10/2021 | Shah | |
| 11,416,673 | B1 * | 8/2022 | Peterson .............. | G06F 3/0483 |
| 11,689,695 | B1 * | 6/2023 | Julian ................... | H04N 7/147 |
| | | | | 348/14.08 |
| 11,985,201 | B1 | 5/2024 | Mehta et al. | |

(Continued)

OTHER PUBLICATIONS

U.S. Appl. No. 18/544,864, Filitz et al., Storage Layer Abstraction for Distributed, Self-Sovereign Content Sharing, filed Dec. 19, 2023, 63 pages.

(Continued)

*Primary Examiner* — Chris Parry
*Assistant Examiner* — Dixon F Dabipi
(74) *Attorney, Agent, or Firm* — Fish & Richardson P.C.

(57)     ABSTRACT

The present disclosure involves systems, software, and computer implemented methods for data sharing. An example method incudes receiving, at a first data-owner server of a first user, a document template that describes document fields that may be included in document instances of the template. A request to share the template with a second user is received at the first data-owner server. A first notification is sent, by the first data-owner server and to a second data-owner server of the second user, that the template has been shared with the second user. A first request for the template is received by the first data-owner server. Contents of the template are provided by the first data-owner server in response to the first request. Contents of a first document instance of the template are received by the first data-owner server from the second data-owner server.

20 Claims, 20 Drawing Sheets

(56) References Cited

U.S. PATENT DOCUMENTS

| | | | |
|---|---|---|---|
| 12,250,314 B2 | 3/2025 | Seaborn et al. | |
| 2002/0143798 A1 | 10/2002 | Lisiecki et al. | |
| 2009/0077056 A1* | 3/2009 | Ravikumar | G06F 16/9535 |
| | | | 707/999.005 |
| 2011/0239113 A1* | 9/2011 | Hung | G16H 15/00 |
| | | | 715/271 |
| 2012/0002883 A1* | 1/2012 | Gotoh | H04N 1/00132 |
| | | | 382/217 |
| 2013/0073685 A1* | 3/2013 | Isaza | H04L 67/14 |
| | | | 709/219 |
| 2014/0280535 A1 | 9/2014 | Owens et al. | |
| 2016/0323400 A1 | 11/2016 | Rusinov | |
| 2016/0373516 A1* | 12/2016 | Reyes | G06F 3/1423 |
| 2017/0193835 A1* | 7/2017 | Bonney-Ache | G09B 7/02 |
| 2020/0250662 A1* | 8/2020 | Carpenter | G06Q 30/0635 |
| 2020/0320042 A1* | 10/2020 | Fitzer | G06F 16/185 |
| 2024/0169092 A1 | 5/2024 | Hu | |

OTHER PUBLICATIONS

U.S. Appl. No. 18/544,877, Filitz et al., Access and Authentication Process for Distributed, Self-Sovereign Content Sharing, filed Dec. 19, 2023, 67 pages.

Learn.microsoft.com [online], "Azure Storage Explorer reauthenticate error when accessing my tenant" Apr. 2023, retrieved on Aug. 13, 2025, retrieved from URL<https://learn.microsoft.com/en-us/answers/questions/1200663/azure-storage-explorer-reauthenticate-error-when-a>, 5 pages.

Non-Final Office Action in U.S. Appl. No. 18/544,864, mailed on Aug. 13, 2025, 12 pages.

* cited by examiner

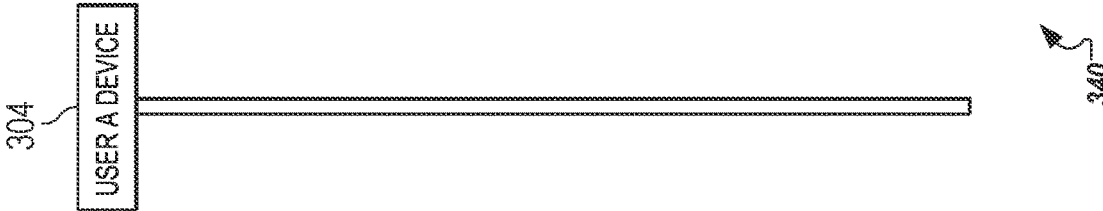

USER A DEVICE 304

BACKEND A 306

BACKEND B 312

USER B DEVICE 330

USER B AUTHENTICATES THEMSELF TO BACKEND B 350

USER B TELLS BACKEND B TO ISSUE THEM AN AUTH TOKEN FOR BACKEND A 352

BACKEND B SENDS AUTH TOKEN FOR BACKEND A TO USER B 354

USER B AUTHENTICATES THEMSELF TO BACKEND A USING AUTH TOKEN FOR BACKEND A 356

USER B REQUESTS FILE X FROM BACKEND A 358

BACKEND A CHECKS ACCESS, RETRIEVES FILE X FROM DATA HOST AND SENDS IT TO USER B 360

Figure 9:
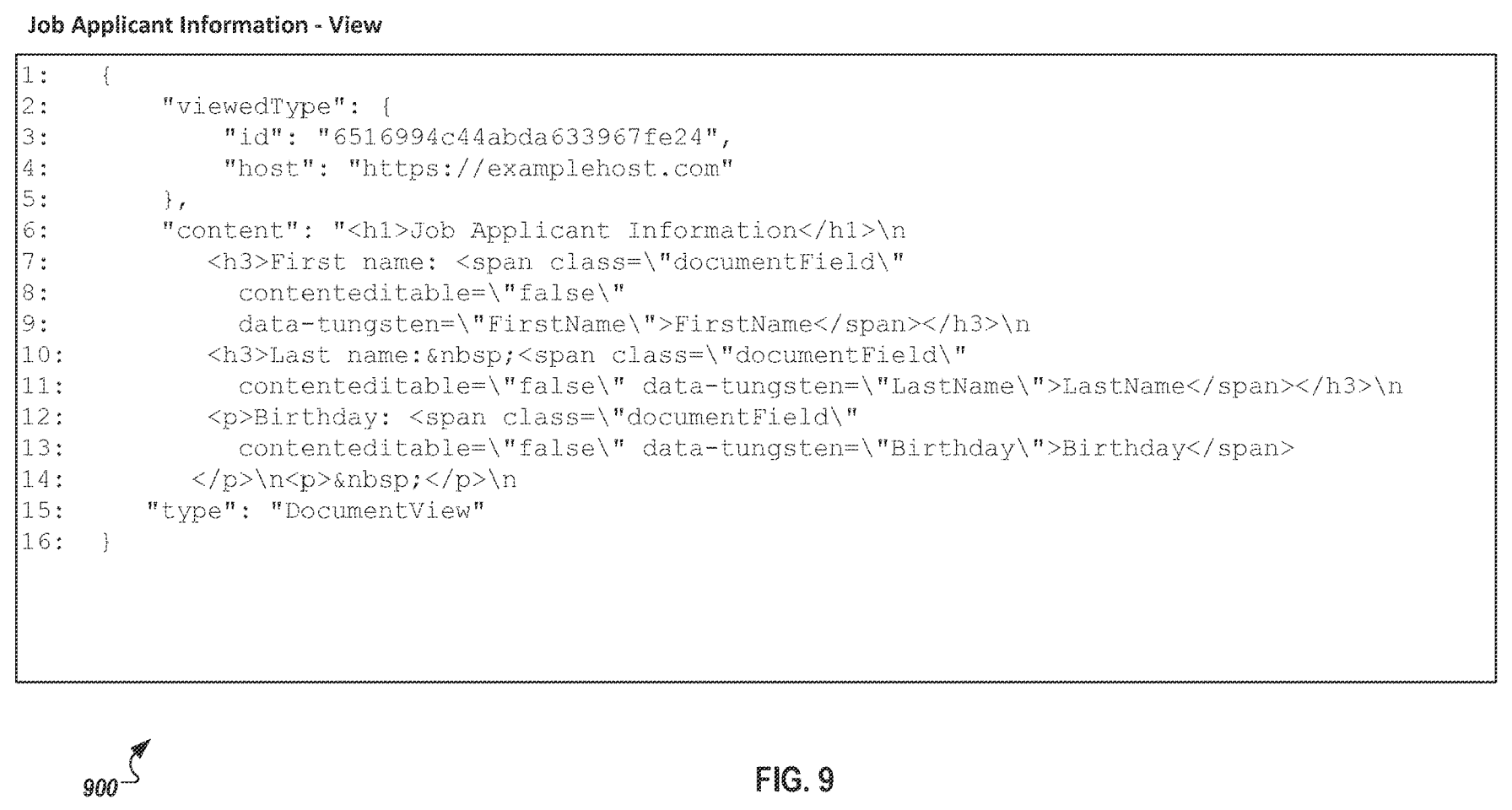

Job Applicant Information - View

```
 1:  {
 2:      "viewedType": {
 3:          "id": "651699 4c44abda63967fe24",
 4:          "host": "https://examplehost.com"
 5:      },
 6:      "content": "<h1>Job Applicant Information</h1>\n
 7:          <h3>First name: <span class=\"documentField\"
 8:              contenteditable=\"false\"
 9:              data-tungsten=\"FirstName\">FirstName</span></h3>\n
10:          <h3>Last name: <span class=\"documentField\"
11:              contenteditable=\"false\" data-tungsten=\"LastName\">LastName</span></h3>\n
12:          <p>Birthday: <span class=\"documentField\"
13:              contenteditable=\"false\" data-tungsten=\"Birthday\">Birthday</span>
14:          </p>\n<p> </p>\n
15:      "type": "DocumentView"
16:  }
```

Job Application for Job X - View

```
 1:  {
 2:      "viewedType": {
 3:          "id": "6516994c44abda633967fe24",
 4:          "host": "https://examplehost.com"
 5:      },
 6:      "content": "<h1>Job Application for Job X - CV</h1>\n
 7:      <h3>First name: <span class=\"documentField\"
 8:          contenteditable=\"false\"
 9:          data-tungsten=\"FirstName\">FirstName</span></h3>\n
10:      <h3>Last name: <span class=\"documentField\"
11:          contenteditable=\"false\" data-tungsten=\"LastName\">LastName</span></h3>\n
12:      <h3>Skills:<span class=\"documentField\" contenteditable=\"false\"
13:          data-tungsten=\"Skills\">Skills</span></h3>",
14:      "type": "DocumentView"
15:  }
```

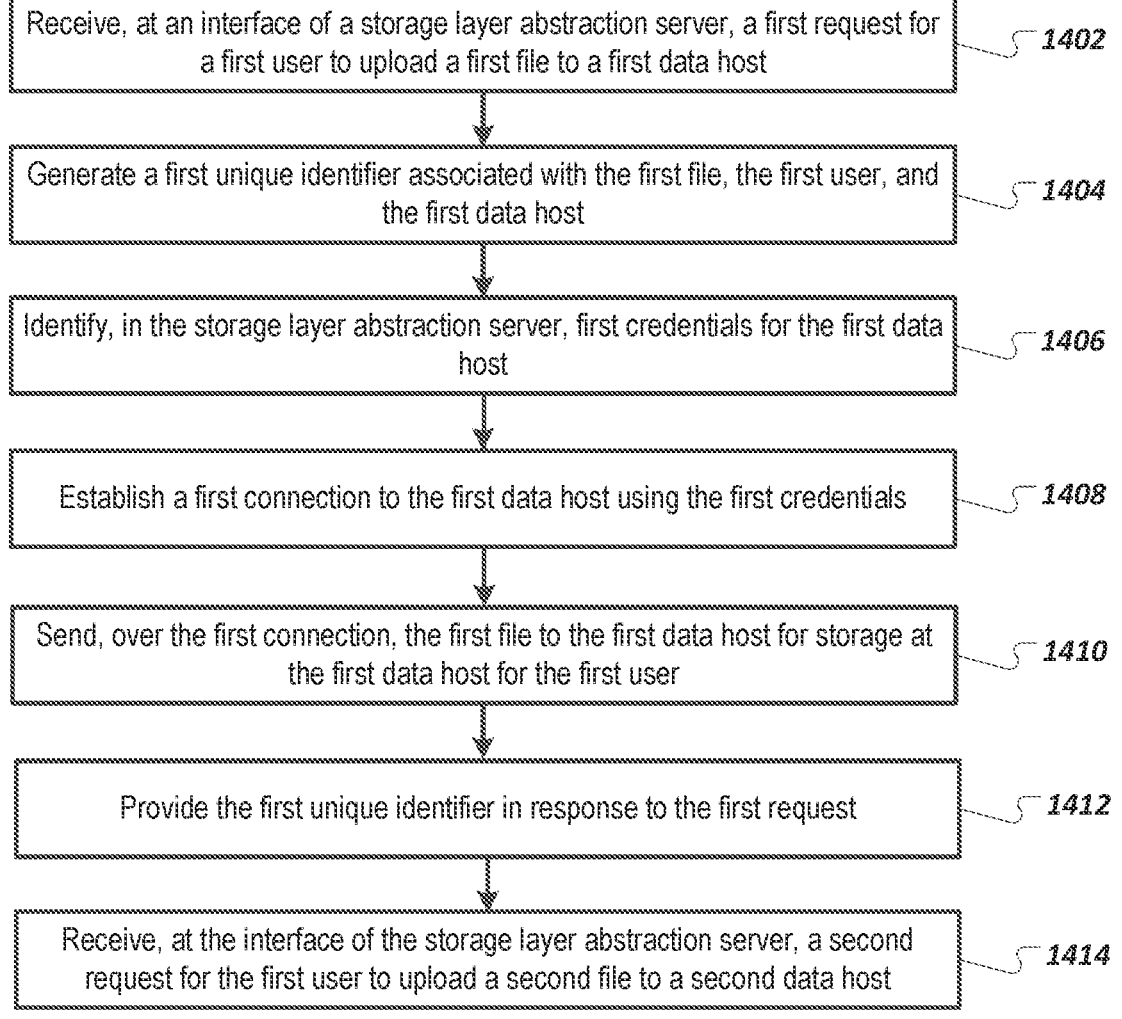

Receive, at an interface of a storage layer abstraction server, a first request for a first user to upload a first file to a first data host ⟩ 1402

Generate a first unique identifier associated with the first file, the first user, and the first data host ⟩ 1404

Identify, in the storage layer abstraction server, first credentials for the first data host ⟩ 1406

Establish a first connection to the first data host using the first credentials ⟩ 1408

Send, over the first connection, the first file to the first data host for storage at the first data host for the first user ⟩ 1410

Provide the first unique identifier in response to the first request ⟩ 1412

Receive, at the interface of the storage layer abstraction server, a second request for the first user to upload a second file to a second data host ⟩ 1414

FIG. 14   1400

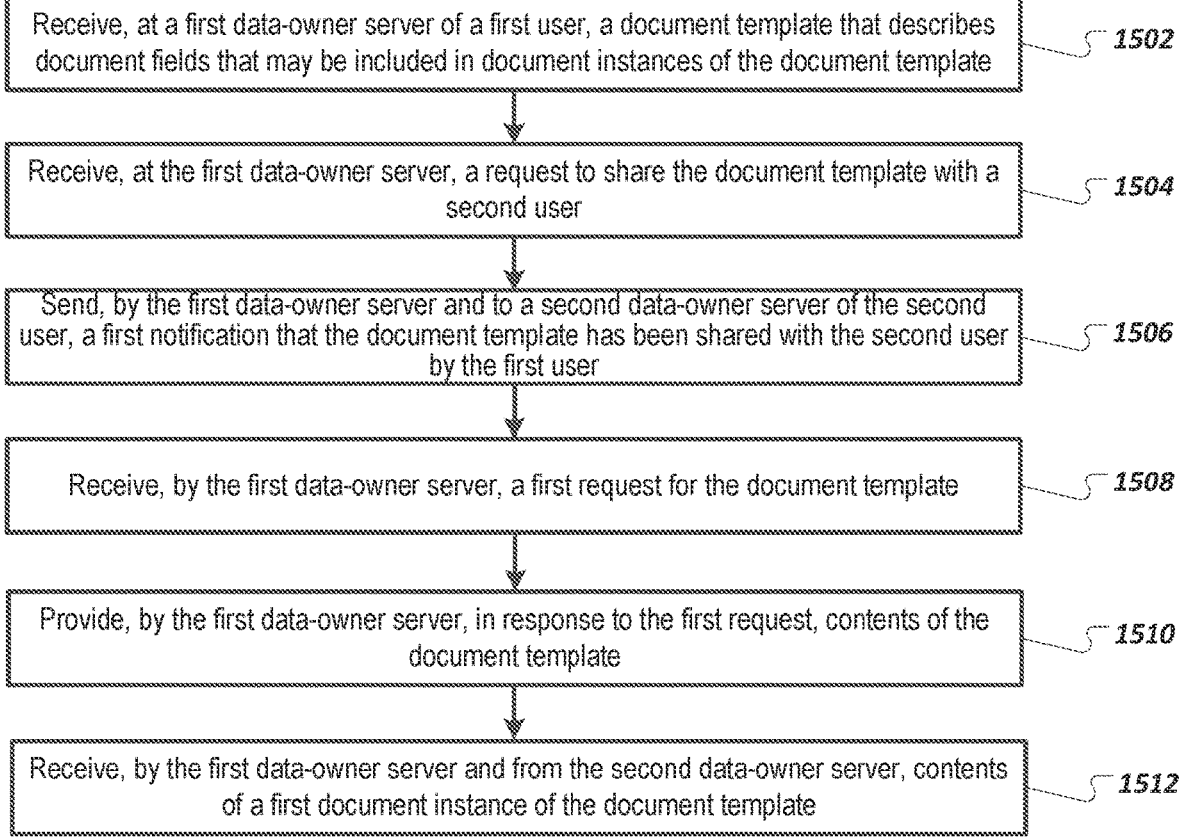

Receive, at a first data-owner server of a first user, a document template that describes document fields that may be included in document instances of the document template — 1502

Receive, at the first data-owner server, a request to share the document template with a second user — 1504

Send, by the first data-owner server and to a second data-owner server of the second user, a first notification that the document template has been shared with the second user by the first user — 1506

Receive, by the first data-owner server, a first request for the document template — 1508

Provide, by the first data-owner server, in response to the first request, contents of the document template — 1510

Receive, by the first data-owner server and from the second data-owner server, contents of a first document instance of the document template — 1512

FIG. 15     1500

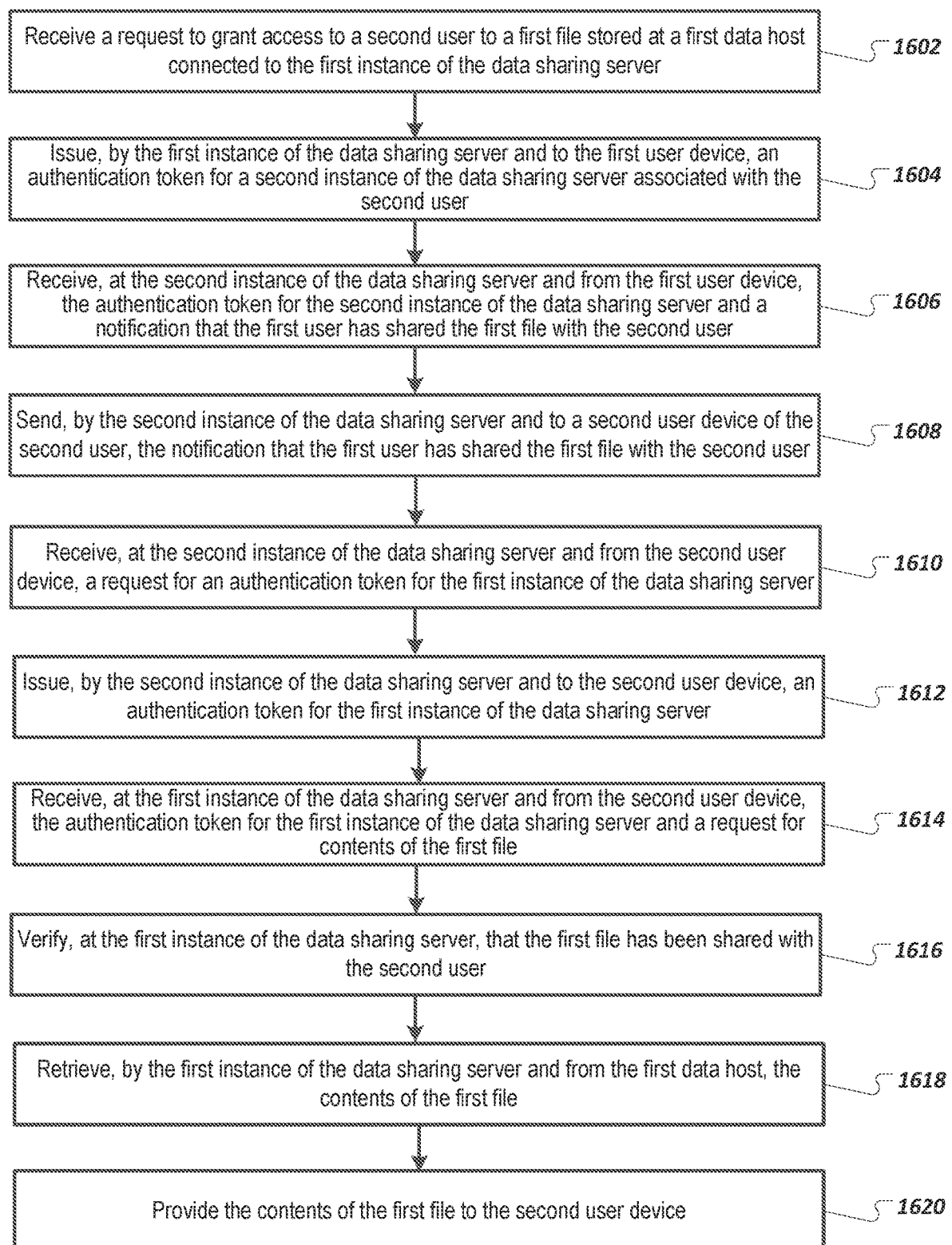

Receive a request to grant access to a second user to a first file stored at a first data host connected to the first instance of the data sharing server — 1602

Issue, by the first instance of the data sharing server and to the first user device, an authentication token for a second instance of the data sharing server associated with the second user — 1604

Receive, at the second instance of the data sharing server and from the first user device, the authentication token for the second instance of the data sharing server and a notification that the first user has shared the first file with the second user — 1606

Send, by the second instance of the data sharing server and to a second user device of the second user, the notification that the first user has shared the first file with the second user — 1608

Receive, at the second instance of the data sharing server and from the second user device, a request for an authentication token for the first instance of the data sharing server — 1610

Issue, by the second instance of the data sharing server and to the second user device, an authentication token for the first instance of the data sharing server — 1612

Receive, at the first instance of the data sharing server and from the second user device, the authentication token for the first instance of the data sharing server and a request for contents of the first file — 1614

Verify, at the first instance of the data sharing server, that the first file has been shared with the second user — 1616

Retrieve, by the first instance of the data sharing server and from the first data host, the contents of the first file — 1618

Provide the contents of the first file to the second user device — 1620

FIG. 16   1600

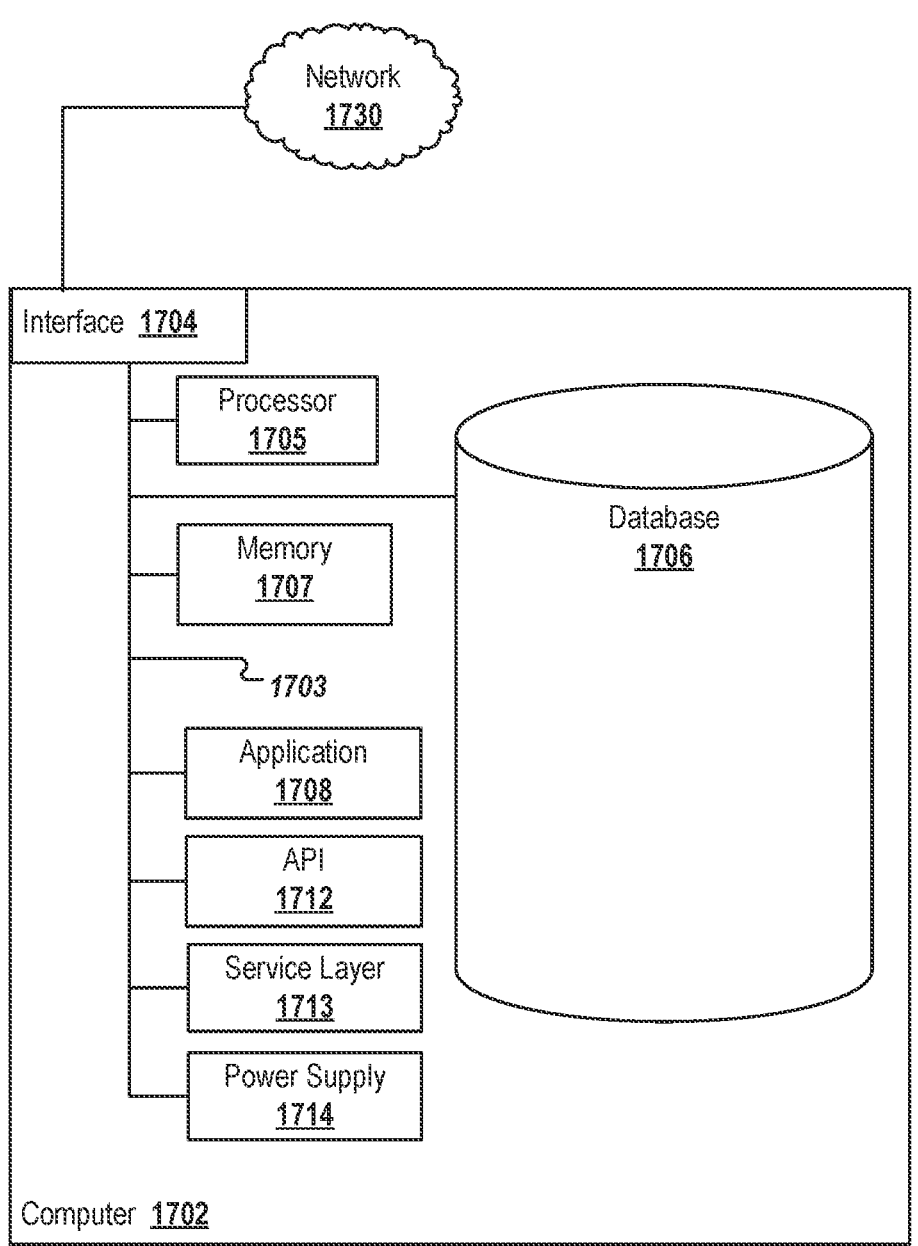
FIG. 17           1700

DOCUMENT TEMPLATING SYSTEM FOR DISTRIBUTED, SELF-SOVEREIGN CONTENT SHARING

TECHNICAL FIELD

The present disclosure relates to computer-implemented methods, software, and systems for distributed self-sovereign content sharing.

BACKGROUND

Increases in connectivity of users across networks can result in different trends. For example, some workers may choose to participate in a "gig economy" in which they offer services and find work through a connected digital platform. As another example, users may interact with other users in a "metaverse" virtual world.

SUMMARY

The present disclosure involves systems, software, and computer implemented methods for distributed self-sovereign content sharing. An example method includes: receiving, at a first data-owner server of a first user, a document template that describes document fields that may be included in document instances of the document template; receiving, at the first data-owner server, a request to share the document template with a second user; sending, by the first data-owner server and to a second data-owner server of the second user, a first notification that the document template has been shared with the second user by the first user; receiving, by the first data-owner server, a first request for the document template; providing, by the first data-owner server, in response to the first request, contents of the document template; and receiving, by the first data-owner server and from the second data-owner server, contents of a first document instance of the document template.

Implementations may include one or more of the following features. A request can be received, at the first data-owner server, to stop sharing the document template with the second user. The first data-owner server can be configured in response to the request to stop sharing the document template with the second user. A request can be received from the second data-owner server for the document template after receiving the request to stop sharing the document template with the second user. The request from the second data-owner server for the document template can be denied. A first view for the document template can be received at the first data-owner server. The first view can enable viewing, in a first format, a first portion of the document fields of the document template. The first view and at least a portion of the contents of the first document instance can be provided to a third user to enable the third user to view, in the first format, values from the first document instance of the first portion of the document fields of the document template. A second view for the document template can be received at the first data-owner server. The second view can enable viewing, in a second format, a second portion of the document fields of the document template, where the second portion is a different portion of the document fields of the document template than the first portion and where the second format is different than the first format. The second view and at least a portion of the contents of the first document instance can be provided to a fourth user to enable the fourth user to view, in the second format, values from the first document instance of the second portion of the document fields of the document template. Receiving, by the first data-owner server and from the second data-owner server, contents of the first document instance of the document template can include: receiving, at the first data-owner server and from the second data-owner server, a second notification that the first document instance has been shared with the first user by the second user; sending a request to the second data-owner server for the first document instance; and receiving, by the first data-owner server and from the second data-owner server, the contents of the first document instance, in response to the request to the second data-owner server for the first document instance.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 3B is a swim lane diagram of an example file sharing process.

FIG. 9 illustrates example view code for a saved view.

FIG. 11 illustrates example view code for a saved view.

FIG. 14 is a flowchart of an example method for a storage layer abstraction for distributed, self-sovereign content sharing.

FIG. 15 is a flowchart of an example method for document templating for distributed, self-sovereign content sharing.

FIG. 16 is a flowchart of an example method for access and authentication for distributed self-sovereign content sharing.

FIG. 17 is a block diagram illustrating an example of a computer-implemented system used to provide computational functionalities associated with described algorithms, methods, functions, processes, flows, and procedures.

DETAILED DESCRIPTION

Figures 1A, 1B:
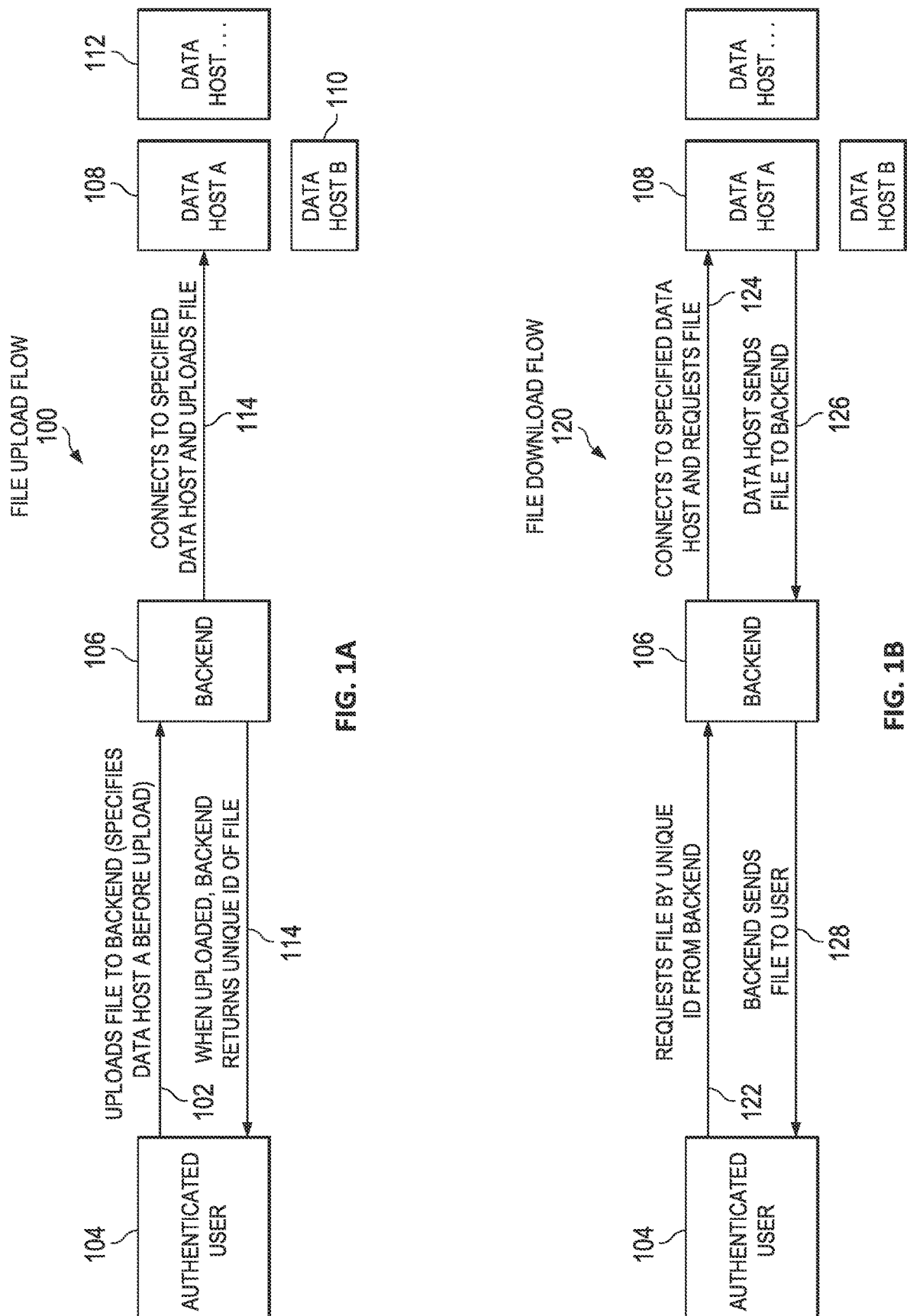
FIG. 1A is a flowchart of an example file upload process.
FIG. 1B is a flowchart of an example file download process.

As mentioned above, digital users may increasingly have need to interact digitally with other users. For example, users may offer services and find gig work through a connected digital platform and/or interact with other users in a metaverse virtual world. Increased digital connectivity can introduce challenges for enabling users to maintain sovereign ownership of information, including controlling how and where user data is stored, who has access to data, how to distribute data, how to request specific data from other users, revoking access to shared data, etc.

Regarding data storage, traditional data storage technologies available to users typically store data in a single data host that is not user-configurable. Additionally, users might not be aware of exactly where their data is stored. Modern user requirements for data storage, particularly for private or sensitive user information, should provide users full control over their own data, including choice of data host, whether to use multiple data hosts, and specifically how to configure different respective data hosts based on particular user needs for different user data.

A single host data provider controlled approach does not meet these requirements. For example, challenges with existing systems can include users not being able to choose where their data is stored. Additional challenges can include not enabling users of a service to use multiple data hosts, which can prevent users from storing data with different security, performance, or other requirements on different data hosts. With current systems, users who use multiple different services to store different sets of data may be forced to provide credentials to different hosts or services to other users to which the user wants to share data, which can introduce security, convenience, and efficiency concerns.

To solve these and other data storage problems, a storage layer abstraction for distributed, self-sovereign content sharing can be used. With the storage layer abstraction, one backend server per user can be used that knows and is aware of all data hosts used by the user. For instance, the user can define multiple data hosts (e.g., of different kinds, using different access protocols, capable of different speeds or assuring different KPIs, etc.). A data-owning user, therefore, can choose a specific data host for a given data set of the user, and can send a request to the backend of the user to upload the data set. The user's backend can upload the data to the selected data host and create a unique identifier for the uploaded data. To share data that has been uploaded, the data-owning user can share the unique identifier with another user (e.g., a receiving user).

As described in more detail below, as part of a secure data-sharing protocol, the receiving user can use the unique identifier to request the shared data, and the data-owning user's backend can handle the data download from the relevant data host and the relaying of shared data to the other user. The data-owning user's backend can manage handling and providing of data host credentials. Accordingly, the receiving user is not provided access or credentials to, and does not directly access, the data-owning user's data host. Accordingly, sharing data between users from different hosts can be handled more securely than traditional approaches in a manner that ensures individual data ownership.

Accordingly, numerous specific advantages can be obtained through use of the storage layer abstraction for distributed, self-sovereign content sharing. First, users can be aware of exactly where their data is stored. Second, users can define where they want their data to be stored. Third, users can choose different data hosts for different data set (e.g., users can store one file on server A and another file on server B). Fourth, users can use all of their data (which may be hosted on different servers) through one unified backend system that provides a unified user interface and experience. Fifth, users can grant indirect access to other users without revealing credentials of their data source. Sixth, users can maintain individual data ownership.

In addition to a general storage layer abstraction, a document templating system can also be provided for distributed, self-sovereign content sharing. The document templating system can enable requesting and/or sharing of certain items of data and enabling and/or revoking access to different portions of requested or shared data. As described below, with the document templating system, document types (e.g., templates), document instances, and document views can be defined and used. The document templating system can enable sharing of data (or templates to create data or views to view data) between users in a decentralized and machine-readable approach, in which shared data stays on data-owner servers, thus maintaining data ownership.

The document templating system can improve upon other approaches such as digital forms. For instance, a traditional digital form approach can include a data requester providing a digital form to a data-providing user requesting the data-providing user to fill out a form with requested data. However, with digital forms, the data-providing user does not maintain control over what happens to provided data after the form is submitted or for how long the data requester maintains access to the provided data.

With the document templating system, each party in a data-sharing relationship maintains full control of their own data. Access to shared data can be revoked by a data owner, for example, when the data owner no longer desires to share data with a receiving user. Human and machine-readable generic formats can be used for document instances, document templates, and document views, thus enabling creation and consumption of such files by and integration with various types of programs in various types of environments.

The document templating system uses a decentralized approach to data administration. For example, a first user can create a document template and a second, different user can create various views for that defined template. Those views created by the second user can be used by a third user, a fourth user, etc., to view document instances of the defined document type.

In addition, data sharing approaches described herein can use a unique access and authentication process for distributed self-sovereign content sharing. As described in more detail below, the access and authentication process can include separate authentication and data transmission steps. Furthermore, individual data ownership can be maintained because a shared file is never copied and therefore never leaves the data owner's server. Because a shared file never leaves the data owner's server, the data owner can control access to the file and access can be revoked at any time. Because copies of files are not produced and distributed, data redundancy is reduced and file content that is shared is always up to date.

The access and authentication process can therefore provide various advantages over other approaches that can include forcing users to use a same platform or approaches in which data copies are sent after which sending users lose control of shared data. For example, with the access and authorization process, users do not need to use a same platform, and respective platforms of users in a data sharing relationship do not need to establish trust before users of those platforms can interact with each other. Accordingly, the access and authentication process can enable users to share data with each other in a distributed and self-sovereign manner. Further details and advantages of the access and authentication process, the document templating system, and the storage layer abstraction are provided below.

FIG. 1A is a flowchart of an example file upload process 100. At 102, a device 104 of an authenticated user uploads a file to a backend 106, where the upload request specifies or refers to a selected data host A 108. The data host A 108 is one data host among potentially a plurality of data hosts that may also include a data host B 110 and other data hosts including a data host 112, for example. At 114, the backend 106 generates a unique identifier for the uploaded file, associates the uploaded identifier with the data host A 108, uploads the file to the data host A 108, and responds to the device 104 of the authenticated user with the unique identifier for the uploaded file.

FIG. 1B is a flowchart of an example file download process 120. At 122, the device 104 of the authenticated user sends a request to the backend 106 for a file using a unique identifier for the file previously received from the backend 106. At 124, the backend 106 uses the unique identifier to identify the data host A 108, connects to the data host A 108 that hosts the requested file, and requests the file from the data host A 108. At 126, the data host A sends the requested file to the backend 106. At 128, the backend 106 sends the requested file to the device 104 of the authenticated user. Further information regarding file sharing and corresponding security details are discussed below with respect to FIGS. 3A-3B.

Figure 2:
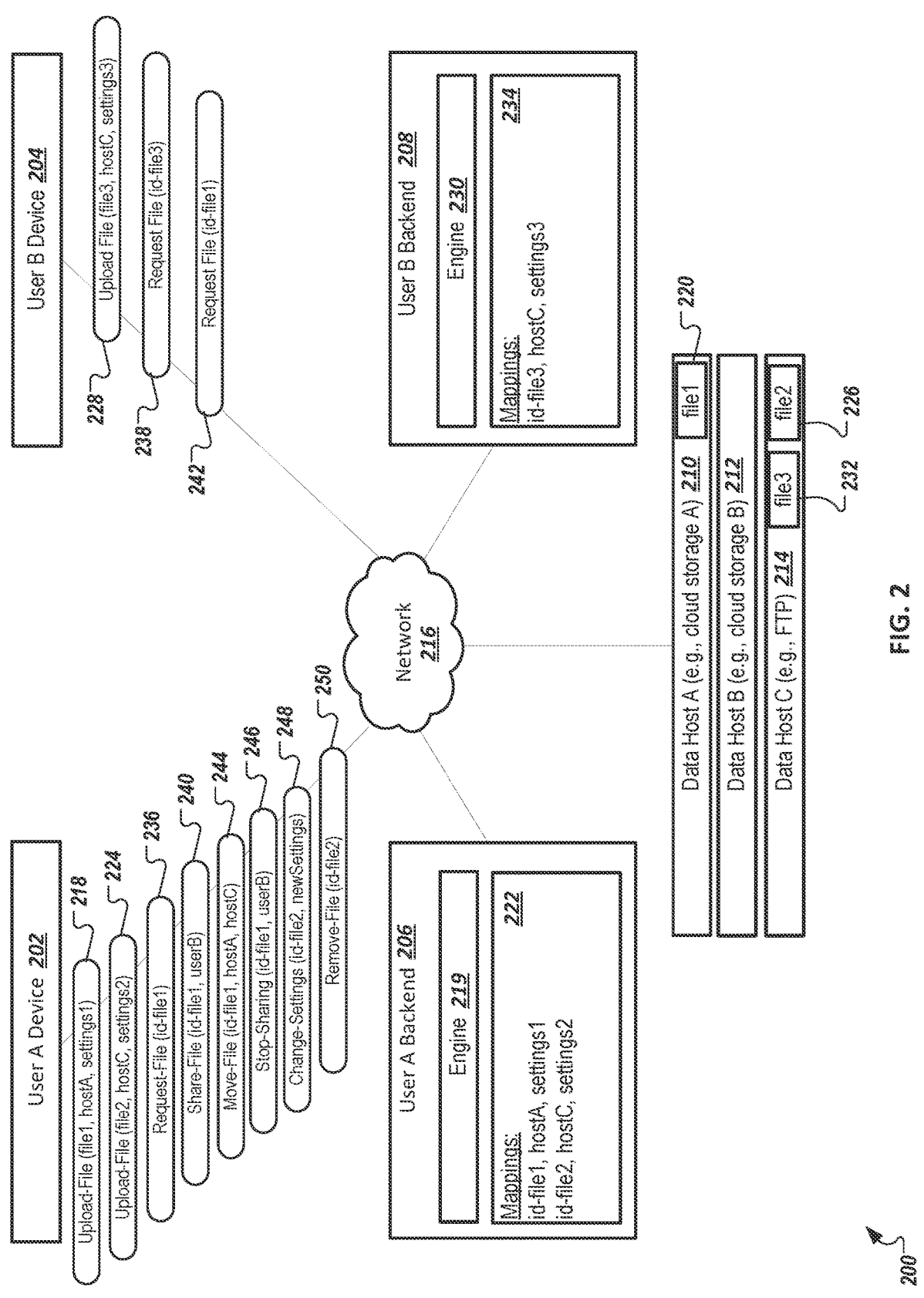
FIG. 2 is a block diagram illustrating an example system for a storage layer abstraction for distributed, self-sovereign content sharing.

FIG. 2 is a block diagram illustrating an example system 200 for a storage layer abstraction for distributed, self-sovereign content sharing. The system 200 includes a user A device 202, a user B device 204, a user A backend 206, a user B backend 208, a data host A 210, a data host B 212, and a data host C 214, communicating over a network 216. The data hosts can be different types of data hosts. For example, the data host A 210 may be a first type of cloud storage/service, the data host B 212 may be a different type of cloud storage/service, and the data host C 214 may be a FTP (File Transfer Protocol) server. The user A backend 206 and the user B backend 208 can provide a storage layer abstraction for data storage and data sharing by a user A, a user B, and other users.

Example data storage and data sharing transactions are illustrated in FIG. 2. For instance, at 218, the user A device 202 can send an upload-file request to the user A backend 206 to upload a file1 file to the data host A 210 using "settings1" settings (e.g., where the settings1 settings can be certain security settings). In response to the upload-file request, an engine 219 of the user A backend 206 can generate an id-file1 identifier for the file1 upload, upload the file1 file to the data A host 210 (e.g., as an uploaded file 220), and create a mapping for the id-file1 identifier, the data host A 210 (and in some cases the settings1 settings) in a mapping table 222 that maps information for files. The user A backend 206 can return the id-file1 identifier to the user A device 202 after the file1 file has been uploaded to the data host A 210.

Similarly, at 224, the user A device 202 can send an upload-file request to the user A backend 206 to upload a file2 file to the data host C 214 using "settings2" settings. The settings2 settings can, in some instances, be different security settings than the settings1 settings. In response to the upload-file request, the engine 219 of the user A backend 206 can generate an id-file2 identifier for the file2 upload, upload the file2 file to the data host C 214 (e.g., as an uploaded file 226), and create a mapping for the id-file2 identifier, the data host C 214 (and, in some cases, the settings2 settings) in the mapping table 222. The user A backend 206 can return the id-file2 identifier to the user A device 202 after the file2 file has been uploaded to the data host C 214. Accordingly, the user A now has different files (i.e., file1 and file2) stored on different hosts (i.e., the data host A 210 and the data host C 214, respectively), while interfacing with a same user A backend 206.

Each user can have and can interface with their own respective backend. Although a single physical backend can serve different users using different isolated portions of the single physical backend, typically, each user has their own backend. For example, at 228, the user B device 204 of the user B can send an upload-file request to the user B backend 208 to upload a file3 file to the data host C 214 using "settings3" settings (which can be the same or different than settings1 or settings2 settings). In response to the upload-file request, an engine 230 of the user B backend 208 can generate an id-file3 identifier for the file3 upload, upload the file3 file to the data host C 214 (e.g., as an uploaded file 232), and create a mapping for the id-file3 identifier, the data host C 214 (and in some cases the settings3 settings) in a mapping table 234. The user B backend 208 can return the id-file3 identifier to the user B device 204 after the file3 file has been uploaded to the data host C 214.

The data host C 214 may be, for example, a cloud storage service that can host data for different users. The user B backend 208 and the user A backend 206 can interface with the data host C 214 on behalf of the user B/user B device 204 and the user A/user A device 202, respectively. Although the data host C 214 in the example of FIG. 2 can host data for different users, the data host A 210, for example, may be a private data host only used by the user A. In general, each user can choose a particular data host for a given file based on respective needs, and the user's backend can manage details of interfacing with the data host on behalf of the user.

Each respective user can request a file that they have stored using the storage layer abstraction. For example, at 236, the user A device 202 sends a file request for the file1 file (e.g., using the previously-received id-file1 identifier) to the user A backend 206. The user A backend 206 can use the id-file1 identifier to lookup an entry for the file1 file in the mapping table 222, request the file1 file from the data host A 210, receive file1 contents from the data host A 210, and forward file1 contents to the user device A 202. Similarly, at 238, the user B device 204 sends a file request for the file3 file (e.g., using the previously-received id-file3 identifier) to the user B backend 208. The user B backend 208 can use the id-file3 identifier to lookup an entry for the file3 file in the mapping table 234, request the file3 file from the data host C 214, receive file3 contents from the data host C 214, and forward file3 contents to the user B device 204.

At 240, the user A device 202, in response to a user input by the user A indicating a request to share the file1 file with the user B, sends a file sharing notification to the user A backend 206. The user A backend 206 can record information (e.g., in the mappings table 222 or another log) indicating the sharing of the file1 file to the user B. The user A backend 206 and the user B backend 208 can participate in a sharing protocol (as described in more detail below with respect to FIGS. 3A-3B) that results in a file-shared notification being provided to the user B device 204. At 242, as described in more detail below with respect to FIGS. 3A-3B, the user B device 204 can interface with the user B backend 208 and the user A backend 206 to request the shared file1 file). As part of the sharing protocol, the user A backend 206 can retrieve file1 contents from the data host A 210 and provide file1 contents of the shared file1 file to the user B device 204.

Users can choose to move a file from one data host to another data host. For instance, at 244, the user A device 202 sends a move-file request for the file1 to move the file1 file from the data host A 210 to the data host C 214. The user A backend 206 can handle removing the uploaded file1 file 220 from the data host A 210 and re-uploading the file1 contents as a new uploaded file to the data host C 214. If the user B device 204 sends another request to retrieve the shared file1 file after the file1 file has been moved to the data host C 214, the user A backend 206 can retrieve the file1 contents for the user B form the data host C 214 rather than the data host A 210.

At 246, the user A device 202 sends a stop-sharing notification for the file1 file and the user B to the user A backend 206. The user A backend 206 can record (e.g., in the mappings table 222) that the file1 file is no longer being shared with the user B. Accordingly, any requests for the file1 file from the user B device 204 can be denied.

As another example, users can choose to adjust settings for uploaded files. For instance, at 248, the user A device 202 sends, to the user A backend 206, a change-settings request for the file2 file with updating settings. The user A backend 206 can record the changed settings (e.g., in the mappings table 222) or by sending a request to the data host C for the file2 file to apply any applicable changes to or for the uploaded file 226.

At 250, the user A device 202 sends a remove-file request for the file2 file to the user A backend 206. The user A backend 206 can look up information in the mappings table 222 for the file2 file to identify that the file2 file is stored at the data host C 214. The user A backend 206 can connect to the data host C 214 and request removal of the uploaded file2 file 226 from the data host C 214.

Figure 3A:
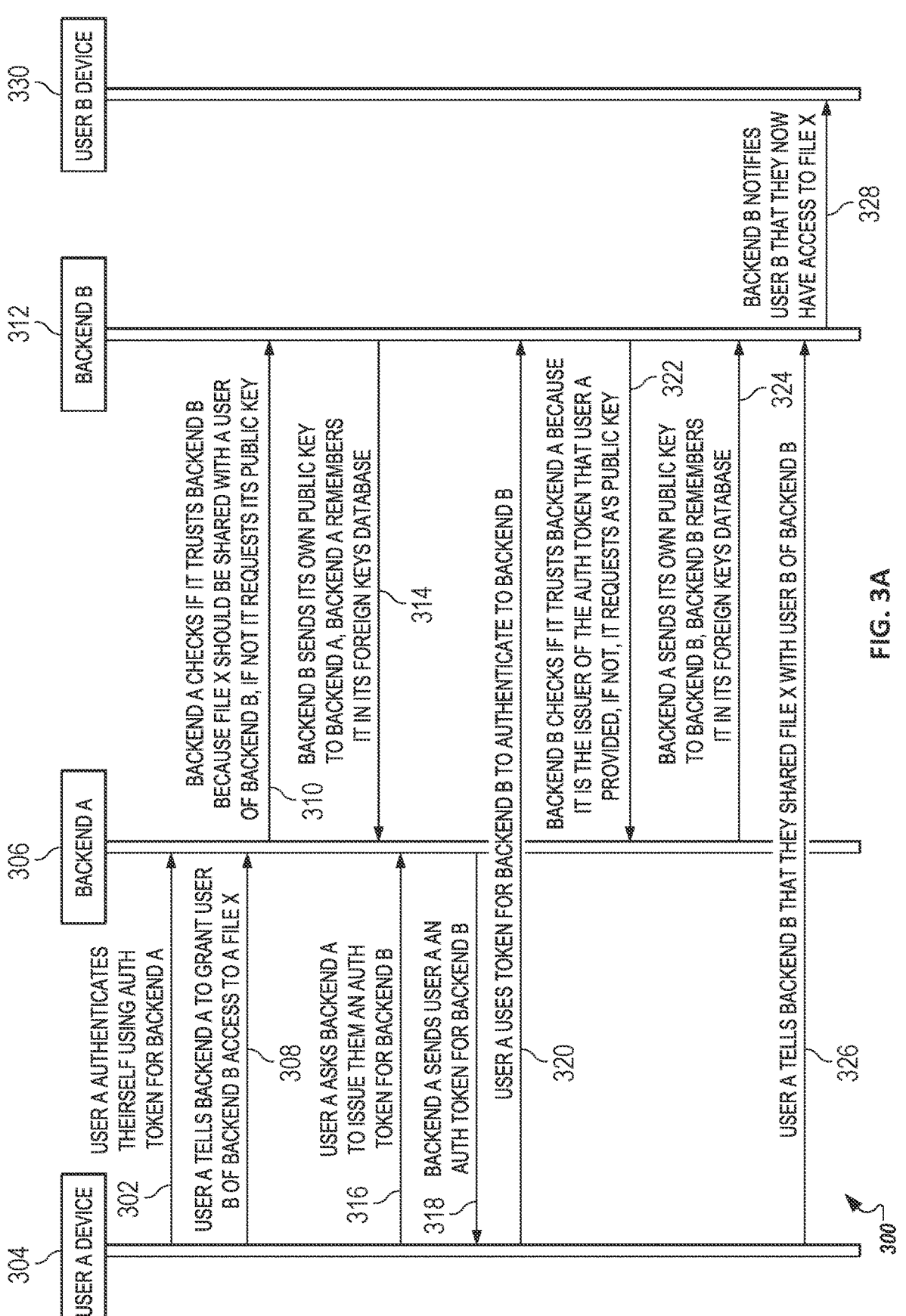
FIG. 3A is a swim lane diagram of an example file sharing process.

FIG. 3A is a swim lane diagram of an example file sharing process 300. At 302, a user device 304 of a user "A" authenticates to a backend 306 of the user A using an auth token for the backend 306.

At 308, the user device 304 sends a request to the backend 306 to grant access to a file "X" to a user "B"

At 310, the backend 306 requests a public key of a backend 312 of the user B from the backend 312. The backend 306 can request the public key of the backend 312 if the backend 306 does not already have a trust relationship with the backend 312. Back ends, including the backend 306 and the backend 312, can use rolling keys (e.g., a given backend can rollover their own keys). Once trusted, a given backend can remember/trust the public key of the trusted backend. These remembered trusted keys can be updated when rolled over by a trusted backend. In some instances, proof of the trust relationship can be provided by signature of a prior trusted key. Backends can use trusted keys to validate auth tokens.

At 314, the backend 312 sends a public key of the backend 312 to the backend 306. The backend 306 can store the public key of the backend 312 in a foreign keys database of the backend 306.

At 316, the user device 304 sends a request to the backend 306 for an authorization token for the backend 312.

At 318, the backend 306 sends an authorization token for the backend 312 to the user device 304 of the user A.

At 320, the user device 304 uses the authorization token for the backend 312 to authenticate to the backend 312.

At 322, the backend 312 checks if it trusts the backend 306, based on the backend 306 being the issuer of the authorization token received by the backend 312 from the user device 304. If the backend 312 does not yet have a trust relationship with the backend 306, the backend 312 sends a request to the backend 306 for the public key of the backend 306.

At 324, the backend 306 sends the public key of the backend 306 to the backend 312. The backend 312 can store the public key of the backend 306 in a foreign keys database of the backend 312.

At 326, the user device 304 sends a notification to the backend 312 indicating that the user A has shared file X with the user B.

At 328, the backend 312 sends a notification to a user device 330 of the user B that notifies the user B that they now have access to the file X.

FIG. 3B is a swim lane diagram of an example file sharing process 340. The file sharing process 340 can be executed after the file sharing process 300.

At 350, the user device 330 of the user B authenticates to the backend 312 of the user B.

At 352, the user device 330 sends a request to the backend 312 for an authorization token for the backend 306 of the user A.

At 354, the backend 312 sends an authorization token for the backend 306 to the user device 330.

At 356, the user device 330 uses the authorization token for the backend 306 to authenticate to the backend 306.

At 358, the user device 330 sends a request to the backend 306 for the file X that has been shared by the user A to the user B.

At 360, the backend 306 confirms that the user B has access, retrieves the file X (e.g., from a data host or a data repository) and sends the file X to the user device 330, for consumption by the user B.

Figure 4:
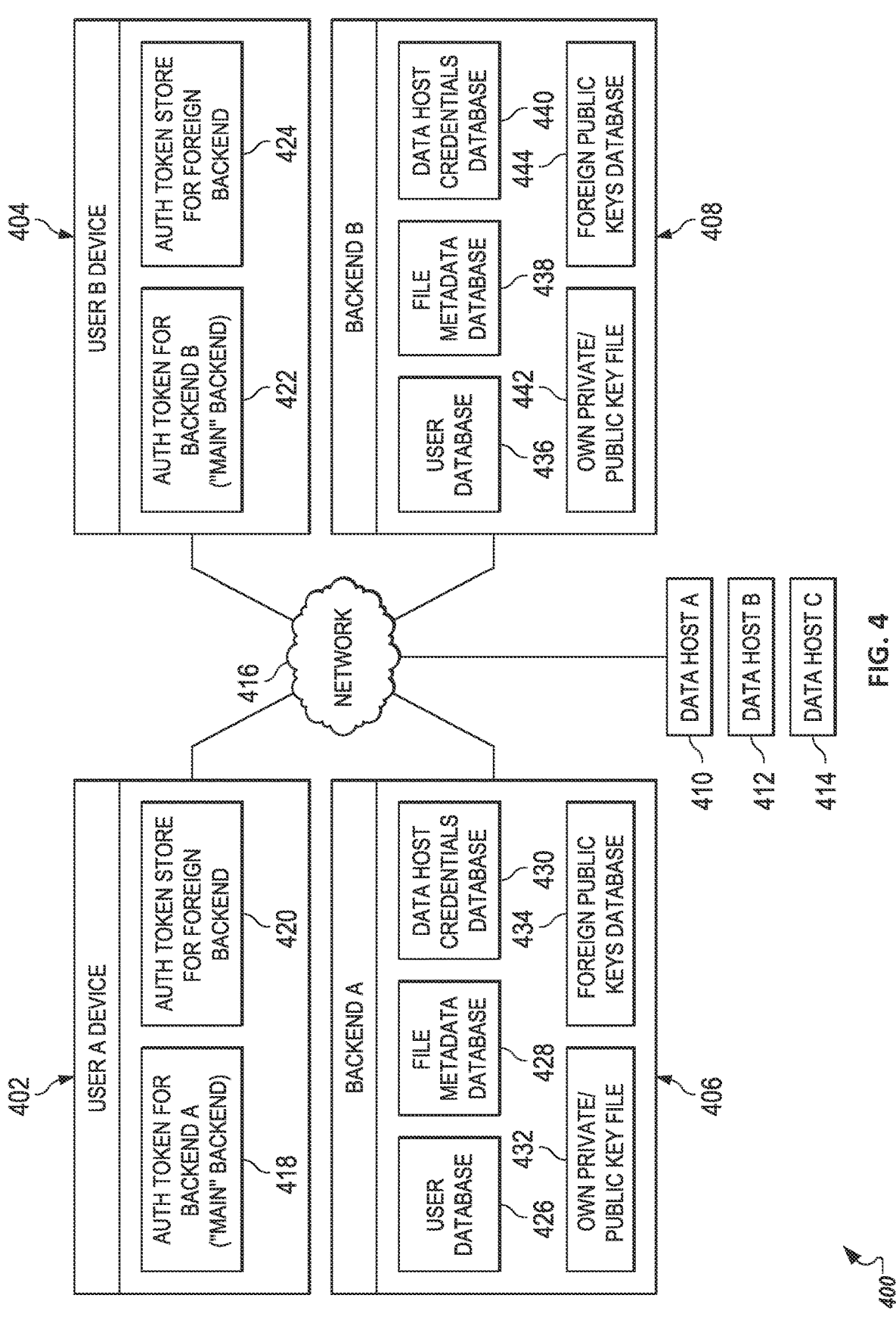
FIG. 4 illustrates an example system for access and authentication for distributed self-sovereign content sharing.

FIG. 4 illustrates an example system 400 for access and authentication for distributed self-sovereign content sharing. The system 400 includes a user A device 402, a user B device 404, a user A backend 406, a user B backend 408, a data host A 410, a data host B 412, and a data host C 414, communicating over a network 416. The user A device 402 includes an auth token 418 for the user A backend 406 and an auth token store 420 for auth tokens for foreign (e.g., other) backends. For example, as described above for step 318 of the process 300, the auth token store 420 can include an auth token for the user B backend 408. Similarly, the user B device 404 includes an auth token 422 for the user B backend 408 and an auth token store 424 for auth tokens for foreign backends. For example, the auth token store 424 can include an auth token for the user A backend 406.

The user A backend 406 includes a user database 426, a file metadata database 428, a data host credentials database 430, a keys store 432, and a foreign keys store 434. The keys store 432 includes public and private keys for the user A backend 406 itself. The foreign keys store 434 can include public keys of other backends, such as a public key of the user B backend 408 (e.g., that the user A backend 406 may have received as described above for step 314 of the process 300).

The user database 426 can include information for user(s) who have data managed by the user A backend 406. Typically, a given backend can manage storage for one user but in some cases a given backend may manage storage for different users in a segmented/tenant fashion. In this example, the user database 426 includes user information for the user A. The file metadata database 428 can include metadata for uploaded files. The file metadata database 428 can be, be similar to, or include the mappings table 222 described above with respect to FIG. 2, for example. The data host credentials database 430 can include information for accessing one or more of the data host A 410, the data host B 412, or the data host C 414 on behalf of the user A or on behalf of a user to which the user A has shared one or more files. The user B backend 408 includes a user database 436, a file metadata database 438, a data host credentials database 440, a keys store 442, and a foreign keys store 444 that include similar content and/or functionality as the user database 426, the file metadata database 428, the data host credentials database 430, the keys store 432, or the foreign keys store 434, respectively, but for the user B/user B backend 408 instead of the user A/user A backend 406.

Figure 5A:
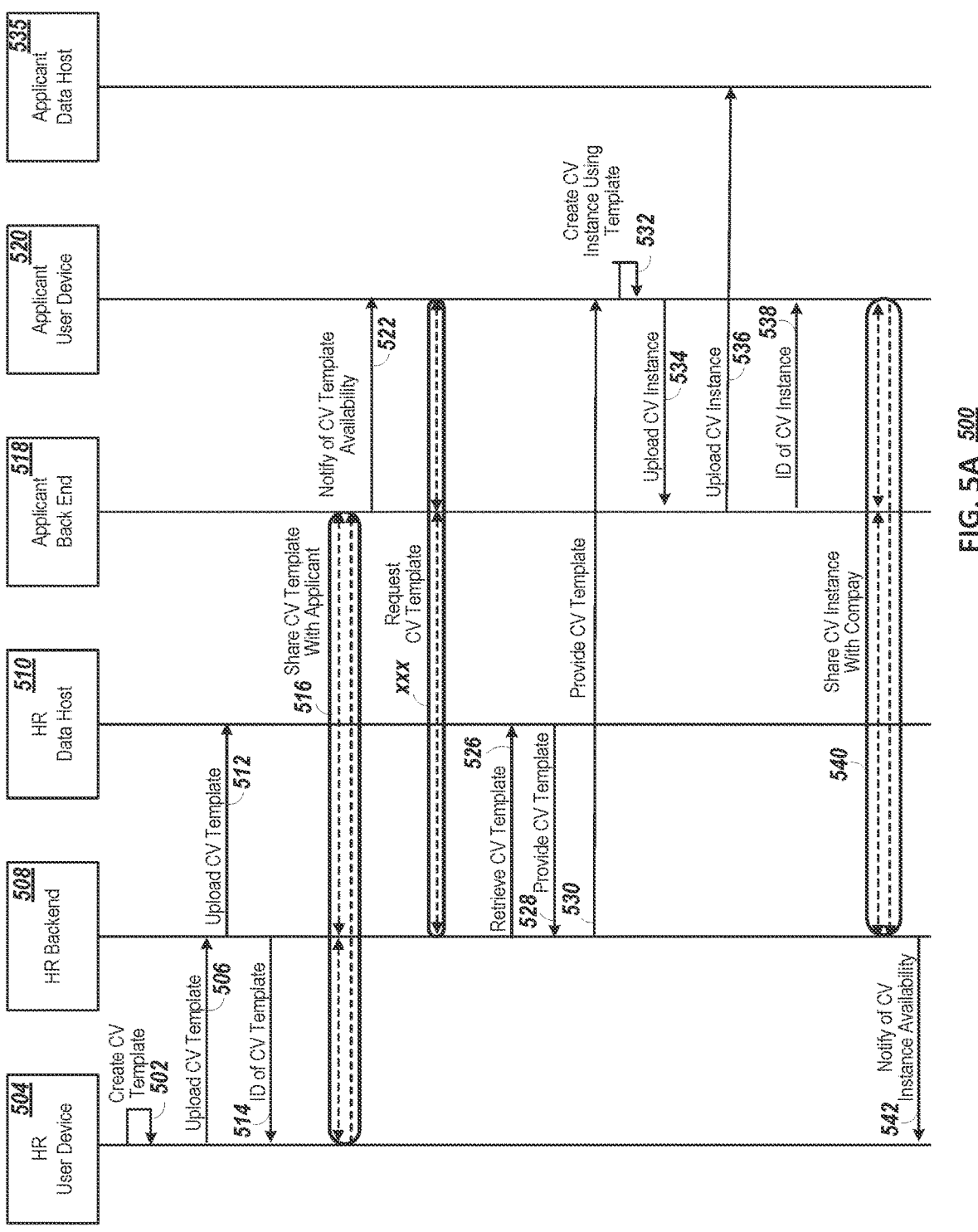
FIGS. 5A-5C illustrate a swim lane diagram of an example document templating process.
Figure 5B:
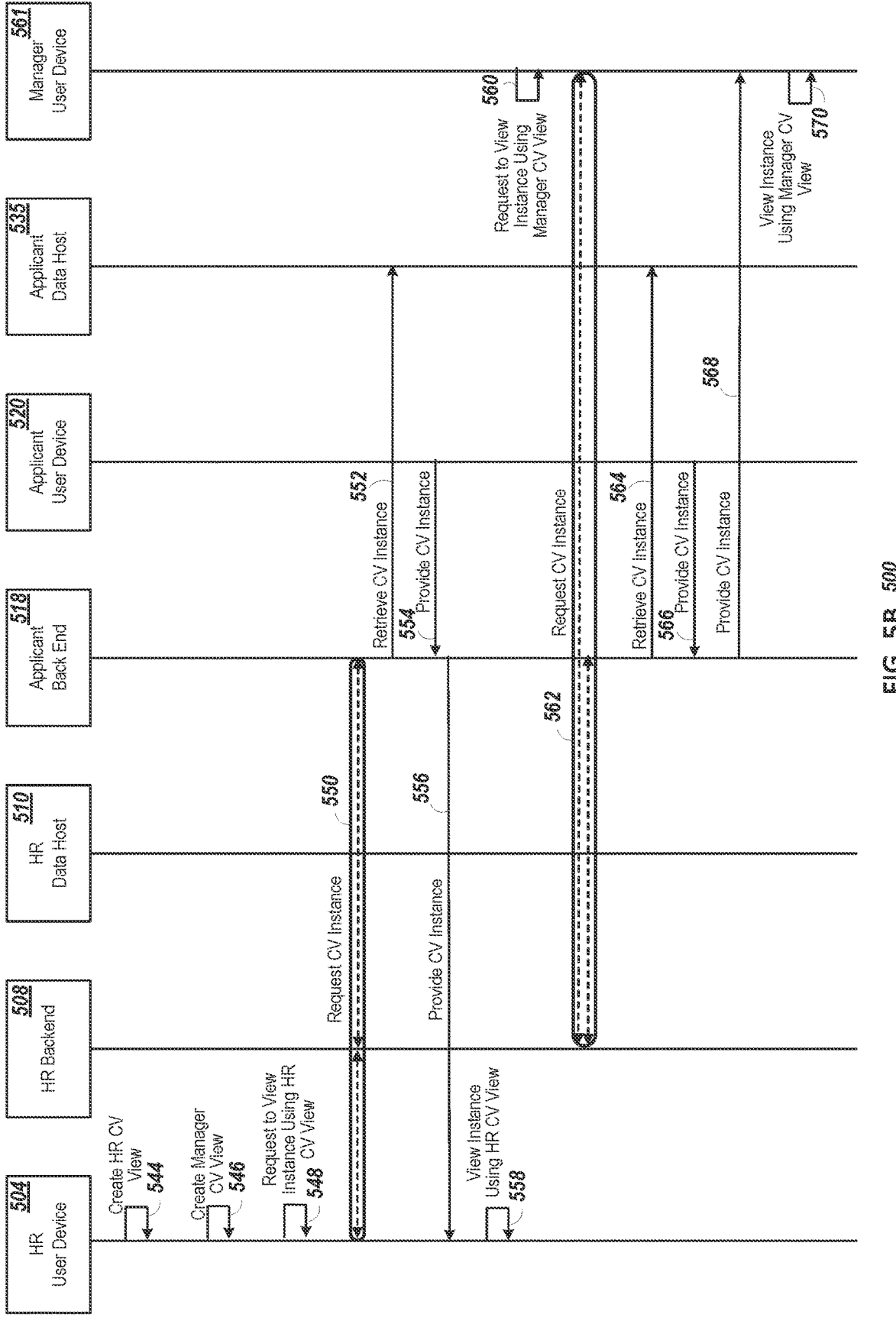
Figure 5C:
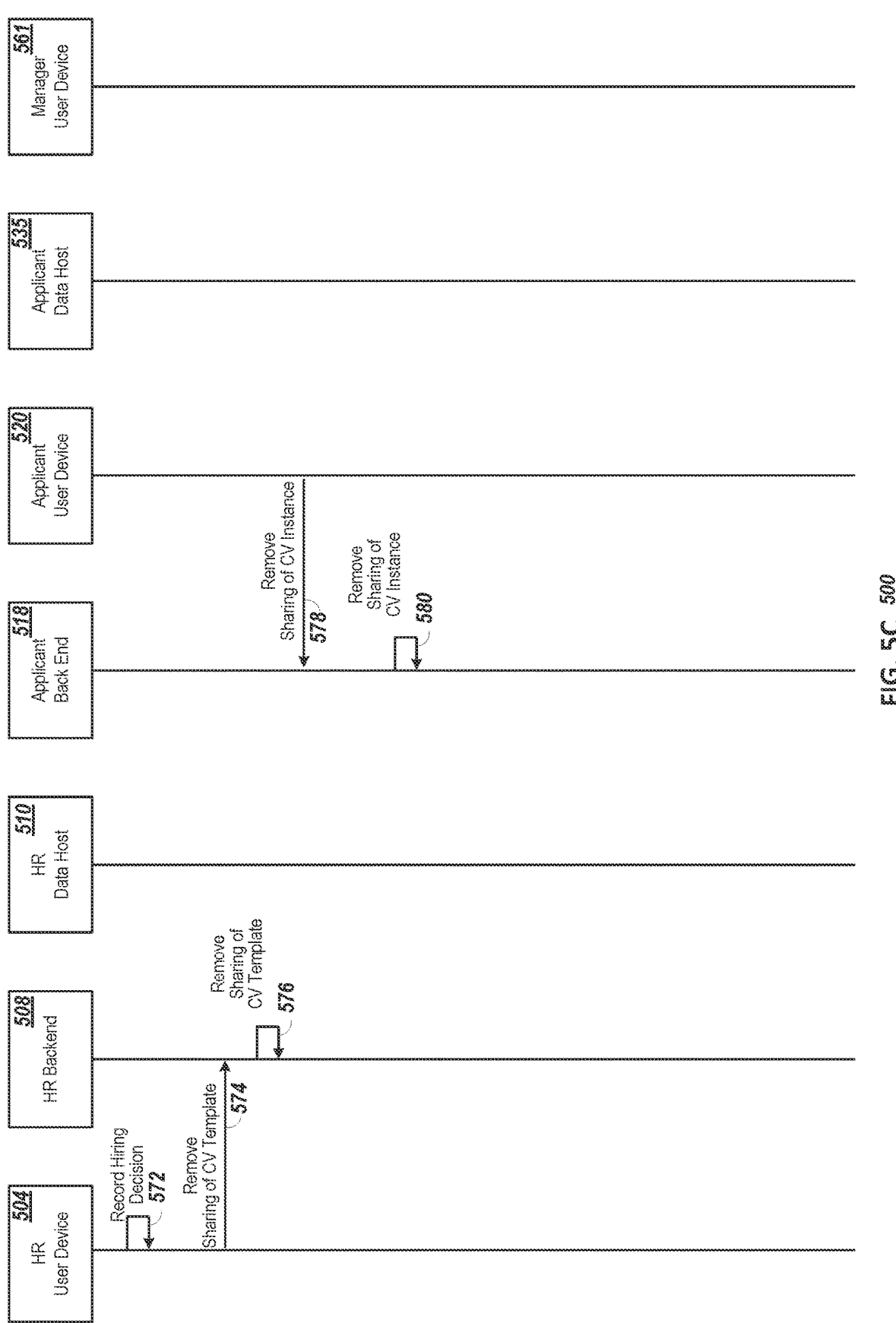

FIGS. 5A-5C illustrate a swim lane diagram of an example document templating process 500. The process 500 represents a scenario in which a job applicant applies for a job at a company. The company asks that job applicants provide certain information to apply for the job. The company can create a template that describes which information is to be provided.

As shown in FIG. 5A, at 502, a human resources (HR) user can use a HR user device 504 to create a CV (Curriculum Vitae) template. The CV template can describe which items of information, of which data types, a job applicant is to provide to apply for a certain job.

Figure 6:
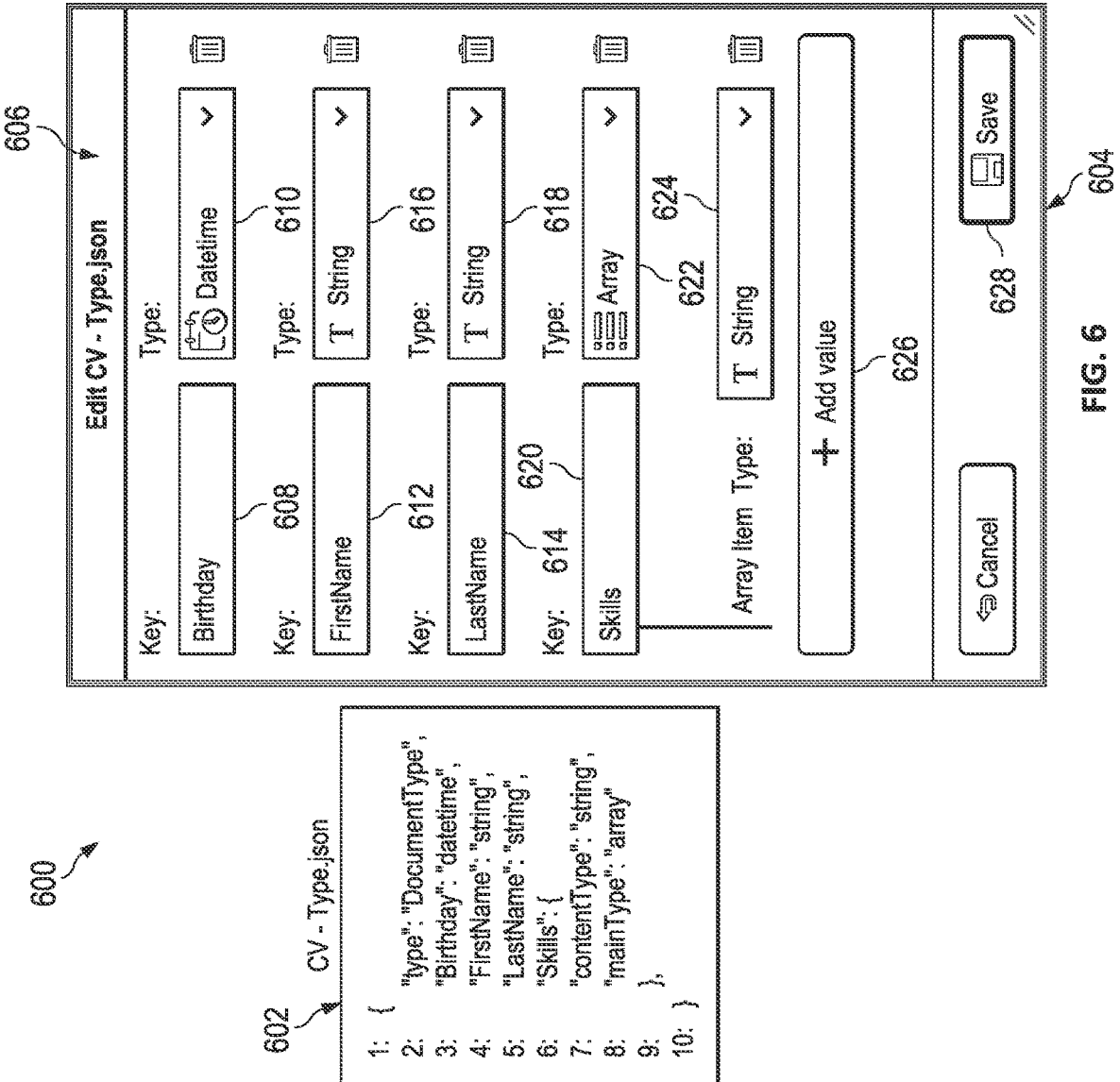
FIG. 6 illustrates an example template definition file and corresponding template definition user interface.

FIG. 6 illustrates an example template definition file 602 and corresponding template definition user interface 604. The template definition file 602 defines a CV template that describes what type of data a job applicant should provide to apply for a job. The template definition user interface 604 can be used to create and modify contents of the template definition file 602, for example. As another example, a user can directly edit the template definition file 602 (e.g., using a text editor or a JSON (JavaScript Object Notation) editor). The template definition file 602 can be represented in a JSON format, for example.

The example template definition file 602 includes, in lines one to ten, a definition of a "CV-Type" template. The example template definition file 602 can have a name of "CV-Type.json", for example. A title bar 606 of the template definition user interface 604 indicates that the template definition user interface 604 is currently being used to edit a "CV-Type.json" file (e.g., the template definition file 602). Line two of the template definition file 602 defines a type of the template definition file 602 as a document type (e.g., template) definition.

Line three of the template definition file 602 defines a birthday field for the template that has a data type of "datetime". The template definition user interface 604 displays a corresponding birthday field 608 (e.g., a field with a key of "birthday") and a data type selection control 610 that is currently set to the "datetime" data type. The user can change the name of the birthday field 608 (e.g., by editing the text displayed in the birthday field 608) and/or can modify the datatype of the birthday field 608 using the data type selection control 610.

Similarly, lines four and five of the template definition file 602 define "FirstName" and "LastName" fields for the template, each with a data type of "string". Corresponding "FirstName" 612 and "LastName" 614 fields are displayed in the template definition user interface 604, along with respective data type selection controls 616 and 618.

Lines six to nine of the template definition file 602 define a composite field for the template named "Skills". The "Skills" field is defined as an array of string items. That is, the "Skills" field can store a collection of skills, each represented as a string value. The template definition user interface 604 includes a corresponding "Skills" field 620 and a data type selection control 622 that is set to a type of "Array". An array-item-type control 624 is set to "String" to indicate the type of the items in the array.

The user can add a new field to the template by selecting an add button 626. After the add button has been selected, an empty new field and corresponding data type selection control can be displayed in the template definition user interface 604. The user can specify a name and data type for the new field. The user can select a save button 628 to request any changes made using the template definition user interface 604 to be saved to the template definition file 602.

The template can be shared with job applicants in various ways, including using approaches described above with respect to FIGS. 3A-3B.

For example, referring again to FIG. 5A, at 506, a HR user can use the HR user device 504 to send an upload request for the CV template to a HR backend 508. The upload request can specify a HR data host 510 that is to host the CV template. At 512, the HR backend 508 can upload the CV template to the HR data host 510. At 514, the HR backend 508 can provide an identifier of the uploaded CV template to the HR user device 504.

The company can share the CV template with a job applicant to communicate to the job applicant what items of information the job applicant should provide to apply for a job at the company. At 516, the HR user device 504 and the HR backend 508 can participate in a sharing protocol to set up the CV template for sharing with a job applicant who has an applicant backend 518 and an applicant user device 520. The sharing protocol can be performed as described above with respect to FIGS. 3A-3B.

At 522, as part of the sharing protocol, the applicant backend 518 sends a notification to the applicant user device 520 that the company has shared the CV template with the job applicant and that the CV template is available from the HR backend 508.

At 524, as part of the sharing protocol, the applicant user device 520 interacts with the applicant backend 518 and the HR backend 508 to request the CV template from the HR backend 508 (e.g., as described above with respect to FIGS. 3A-3B).

At 526, in response to the request from the job applicant for the CV template, the HR backend 508 retrieves the CV template from the HR data host 510 (e.g., as described above with respect to FIGS. 3A-3B).

At 528, the HR data host 510 provides the CV template to the HR backend 508.

At 530, the HR backend 508 provides the CV template to the applicant user device 520.

At 532, the job applicant can use the applicant user device 520 to create a CV instance using the received CV template. For instance, the job applicant can create the CV instance as described below for FIG. 7.

Figure 7:
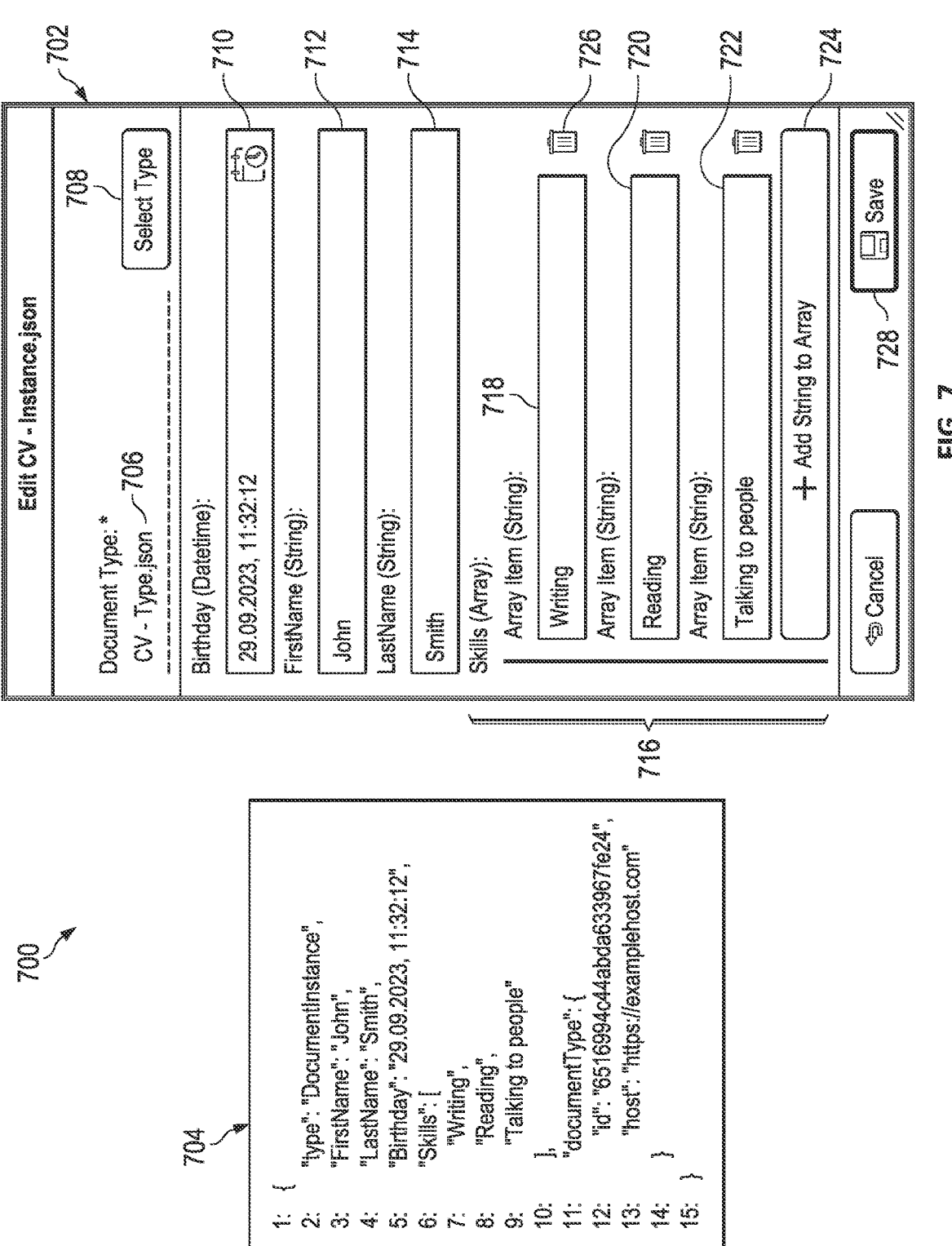
FIG. 7 is a diagram that illustrates a template instance editor and an example template instance file.

FIG. 7 is a diagram 700 that illustrates a template instance editor 702 and an example template instance file 704. The template instance editor 702 can be used to create and edit the template instance file 704, for example. The template instance editor 702 is one example editor and other editors can be used. As an example, a currently selected template 706 of "CV-Type.json" is shown. For instance, continuing the job applicant example, the company may have shared the "CV-Type.json" template (e.g., a "CV template") with a job applicant, and provided access to the template instance editor 702. If other templates have been shared with the user (e.g., by the company or by another entity), the user can select a "select type" button 708 to be presented with a list of templates that are available to the user (and the user can then select a different available template, if applicable).

Since the currently selected template 706 is "CV-Type.json", the user can enter or modify birthdate, first name, and last name values in birthdate 710, first name 712, and last name 714 fields, respectively. Additionally, the user can use a skills area 716 of the template instance editor 702 to add, remove, or modify a collection of skill phrases (e.g., strings) that describe skills of the user. For example, the skills area 716 currently includes a writing skill 718, a reading skill 720, and a "talking to people" skill 722. The user can add an additional skill by selecting an add button 724 and entering a new skill phrase. The user can remove a skill by selecting a respective delete icon (e.g., an icon 726). The user can request saving of any additions or changes made using the template instance editor 702 to the template instance file 704 by selecting a save button 728.

For example, lines three, four, and five of the template instance file 704 store the birthdate, first name, and last name values displayed in the birthdate 710, first name 712, and last name 714 fields, respectively. Additionally, lines six to ten of the template instance file 704 store skill information displayed in the skills area 716. Line two and lines eleven to fourteen of the template instance file 704 indicate that the template instance file 704 is a document instance of a document type defined by a template with an identifier of "6516994c44abda633967fe24" that was issued by a backend host with an address of "https://examplehost.com". That is, the template instance file 704 is an instance of the CV template described above with respect to FIG. 6.

Referring again to FIG. 5A, the job applicant can, after creating a CV instance using the CV template, share the CV instance with the company. For example, at 534, the job applicant can use the applicant user device 520 to send an upload request for the CV instance to the applicant backend 518. The upload request can specify an applicant data host 5535 that is to host the CV instance. At 536, the applicant backend 518 can upload the CV instance to the applicant data host 535. At 538, the applicant backend 518 can provide an identifier of the uploaded CV instance to the applicant user device 520.

At 540, the applicant user device 520, the applicant backend 518, and the HR backend 508 can participate in a sharing protocol to set up the CV instance for sharing with the company by the applicant. The sharing protocol can be performed as described above with respect to FIGS. 3A-3B.

At 542, as part of the sharing protocol, the applicant backend 518 sends a notification to the HR user device 504 (or to another device or system at the company) that the applicant has shared the CV instance with the company and that the CV instance is available from the applicant backend 518.

As described above, an instance is an instance of a certain template and different views can be created to view different portions of instances of the template. For example and as shown in FIG. 5B, at 544, an HR user can use the HR user device 504 (or another device) to create a view for CV instances for use by HR personnel. As another example, 554, an HR user can use the HR user device 504 (or another device) to create a view for CV instances for use by hiring managers. The view for HR users can include CV data that HR personnel may need to access, such as applicant name, address, birthdate information, etc. HR personnel may not need to view specific skill information for a given job posting so such information can be excluded from the HR view. Hiring managers, however, can use skill information for hiring decisions so the hiring manager view can include skill information but may exclude some information, such as employee birthdate, that may not be pertinent for a hiring decision.

Regarding views, the sharing approaches described herein can enable sharing of only a part of the information of a document instance (e.g. the information that is used in a specific view). For example, the information viewable in the manager view can be shared with the manager, and information from the CV not viewable in the manager view can be excluded when CV data is shared with the manager. The manager therefore can be prevented from receiving or viewing information not explicitly shared with the manager.

Figure 8:
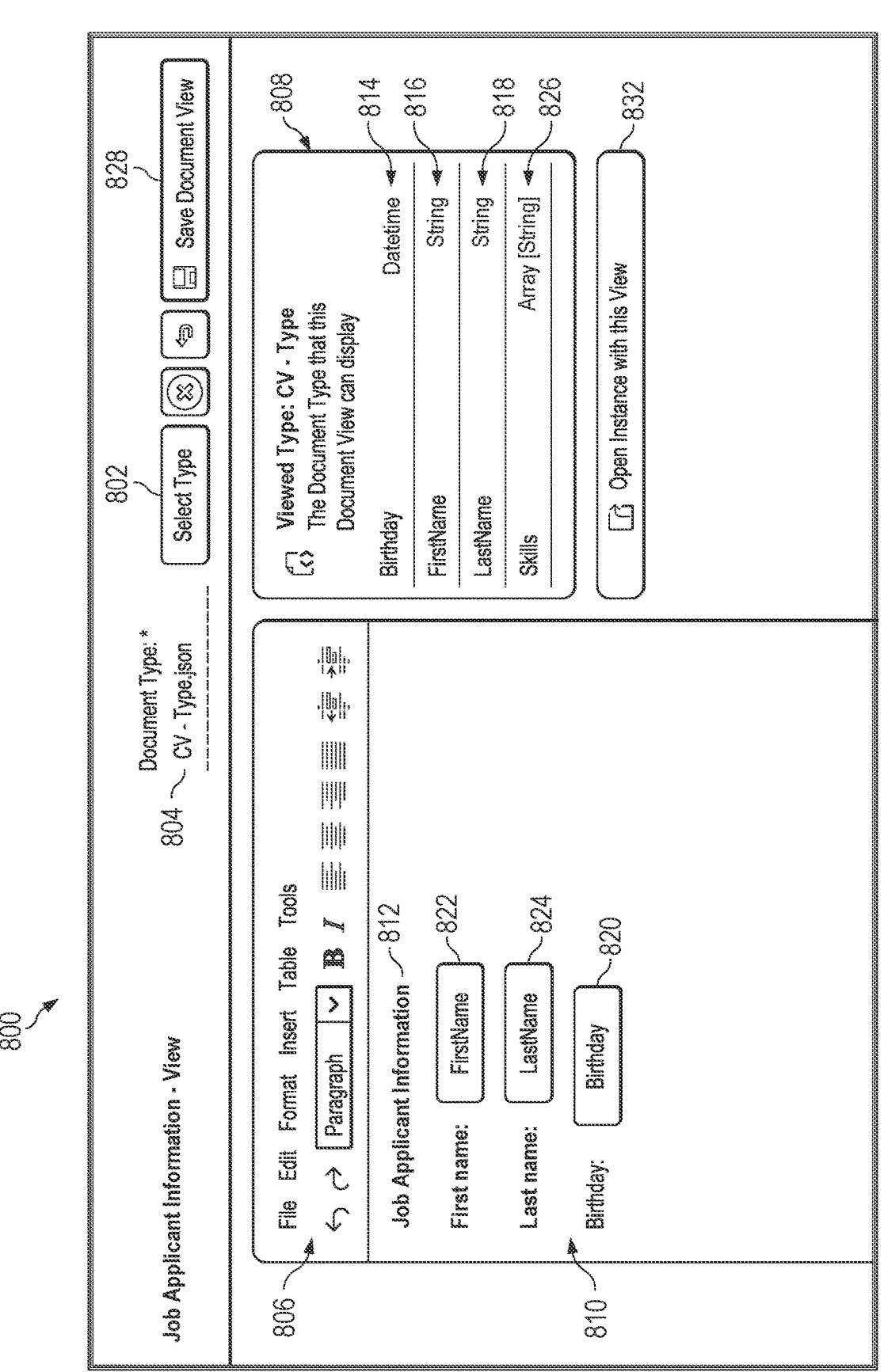
FIG. 8 illustrates an example view definition user interface.

FIG. 8 illustrates an example view definition user interface 800. The view definition user interface 800 can be used to define (e.g., create/modify) a view that is based on a template/document type. For example, the user can select a document type (e.g., template) for a view being defined by selecting a select-type button 802. For example, the user has selected a "CV-Type.json" document type 804 (e.g., the CV template). The user can use editing tools 806 and a template items area 808 to define a view in a view-creation area 810. For instance, the user can use the editing tools 806 to add a static text label 812 of "Job Applicant Information". The user may be defining a view for use by HR users, for example (in contrast to a view that is designed for hiring managers).

The user can use the template items area 808 to select different document elements (e.g., fields) of document instances of the selected template. For example, the user has selected birthday 814, first name 816, and last name 818 document elements and has, for example, dropped selected document elements onto the view-creation area 810 to create corresponding birthday 820, first name 822, and last name 824 document element placeholders, respectively.

The respective document element placeholders represent respective document elements. A given document element placeholder can be replaced with a corresponding document element value when the view is used to display a given document instance (e.g., as described in more detail below).

Figure 12:
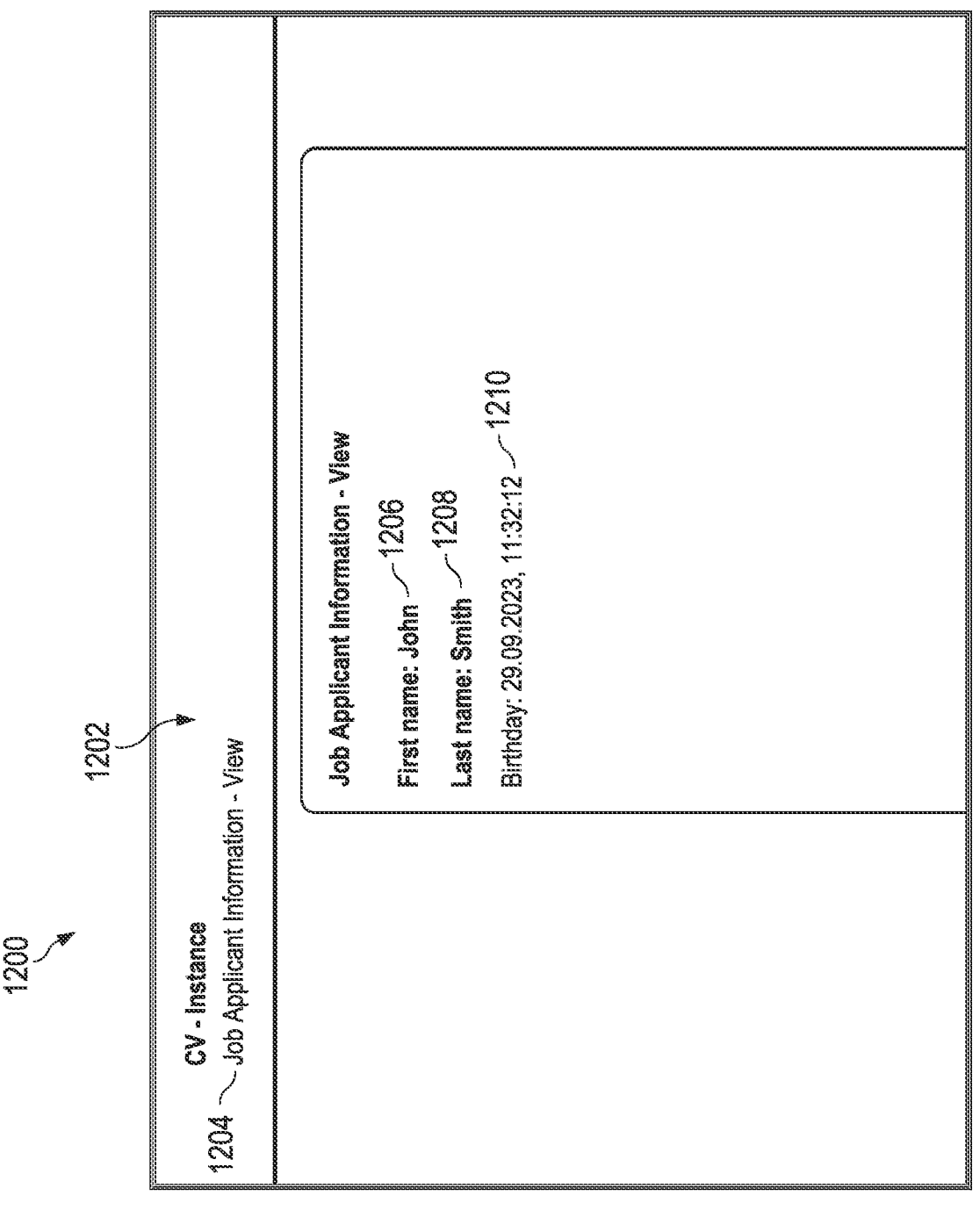
FIG. 12 illustrates an example view presentation user interface.

Since the user is creating a view for use by HR users, the user can choose to not select a skills document element 826 from the template items area 808, if the user decides that for this particular HR user view HR users don't need to see specific skill information. The user can select an open-instance-with-this-view button 832 to open a document instance of the selected document type using the view. FIG. 12, as described below, illustrates the opening of an instance using the view. After the user has finished creating the view, the user can select a save button 828 to request saving of the view. A saved view can be represented using view code, as described below.

FIG. 9 illustrates example view code 900 for a saved view. The view code 900 can correspond to the view created using the view definition user interface 800, for example. For instance, lines two to five and fifteen can indicate that the view code 900 is for a view for a document type that has a particular identifier (e.g., "6516994c44abda633969fe24") and that is hosted by a particular backend host (e.g., https://examplehost.com). Lines six to fourteen define the content of the view. For instance, lines seven to nine include information defining the first name document element placeholder 822 and corresponding label. Similarly, lines ten and eleven include information defining the last name document element placeholder 824 and corresponding label and lines twelve and thirteen include information defining the birthday document element placeholder 820 and corresponding label.

Figure 10:
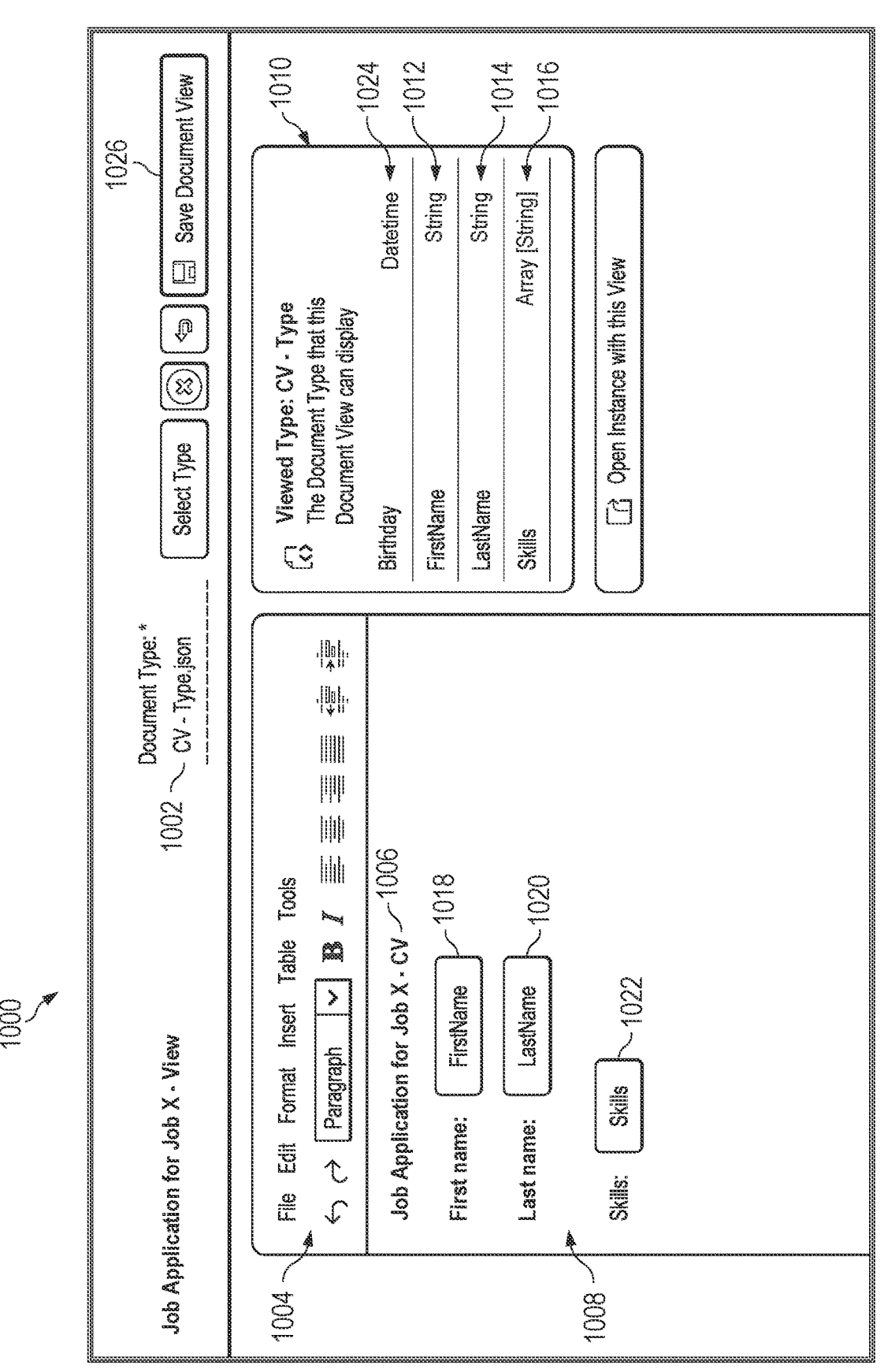
FIG. 10 illustrates another view definition user interface.

FIG. 10 illustrates another view definition user interface 1000. As with the view definition user interface 800, the view definition user interface 1000 can be used to define (e.g., create/modify) a view that is based on a template/document type. For example, the user has selected a "CV-Type.json" document type 1002 (e.g., the CV template). The user has used editing tools 1004 to add a static text label 1006 of "Job Applicant Information" to a view creation area 1008. The user may be defining a view for use by hiring managers, for example (in contrast to a view that is designed for HR users).

Figure 13:
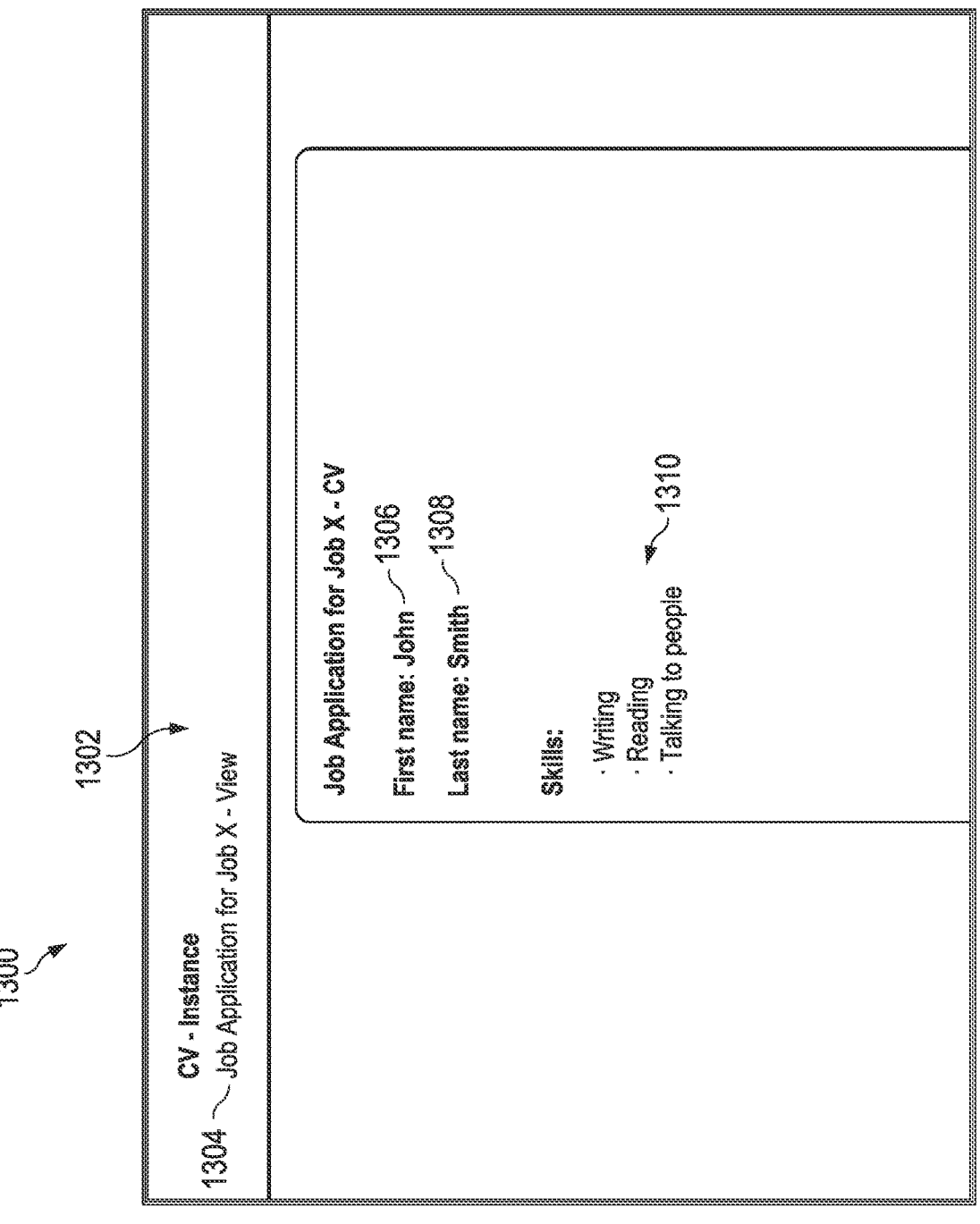
FIG. 13 illustrates another example view presentation user interface.

The user has selected, from a template items area 1010, first name 1012, last name 1014, and skills 1016 document elements and has, for example, dropped selected document elements onto the view creation area 1008 to create corresponding first name 1018, last name 1020, and skills 1022 document element placeholders, respectively. Since the user is creating a view for use by hiring managers, the user can choose to not select a birthdate document element 1024 from the template items area 1010, if the user decides that for this particular view hiring manager users don't need to see applicant birthdate information. After the user has finished creating the view, the user can select a save button 1026 to request saving of the view. The user can select an open-instance-with-this-view button 1028 to open a document instance of the selected document type using the view. FIG. 13, as described below, illustrates the opening of an instance using the view.

FIG. 11 illustrates example view code 1100 for a saved view. The view code 1100 can correspond to the view created using the view definition user interface 1000, for example. For instance, lines two to five and fourteen can indicate that the view code 1100 is for a view for a document type that has a particular identifier (e.g., "6516994c44abda6339611fe24") and that is hosted by a particular backend host (e.g., https://examplehost.com). Lines six to thirteen define the content of the view. For instance, lines seven to nine include information defining the first name document element placeholder 1018 and corresponding label. Similarly, lines ten and eleven include information defining the last name document element placeholder 1020 and corresponding label and lines twelve and thirteen include information defining the skills document element placeholder 1022 and corresponding label.

Referring again to FIG. 5B, at 548, an HR user uses the HR user device 504 to request to view instance data provided by the job applicant using the HR CV view. At 550, as part of the sharing protocol, the HR user device 504 interacts with the HR backend 508 and the applicant backend 518 to request the CV instance shared by the applicant from the applicant backend 518 (e.g., as described above with respect to FIGS. 3A-3B).

At 552, in response to the request from the HR user device 504 for the CV instance, the applicant backend 518 retrieves the CV instance from the applicant data host 535 (e.g., as described above with respect to FIGS. 3A-3B).

At 554, the applicant data host 535 provides the CV instance to the applicant backend 518.

At 556, the applicant backend 518 provides the CV instance to the HR user device 504.

At 558, the HR user views the shared CV instance using the HR CV view.

FIG. 12 illustrates an example view presentation user interface 1200. The view presentation user interface 1200 includes presentation of document instance data using a particular view. For example, as shown by a label 1202, the view presentation user interface 1200 displays CV instance data using a job applicant information view 1204 (e.g., the HR CV view defined using the view definition user interface 800 as described above with respect to FIG. 8). The view presentation user interface 1200 includes first name 1206, last name 1208, and birthdate 1210 document instance values, as defined by the underlying view.

Referring again to FIG. 5B, at 560, a manager user uses a manager user device 561 to request to view instance data provided by the job applicant using the manager CV view.

At 562, as part of the sharing protocol, the manager user device 561 interacts with the HR backend 508 and the applicant backend 518 to request the CV instance shared by the applicant from the applicant backend 518 (e.g., as described above with respect to FIGS. 3A-3B).

At 564, in response to the request from the manager user device 561 for the CV instance, the applicant backend 518 retrieves the CV instance from the applicant data host 535 (e.g., as described above with respect to FIGS. 3A-3B).

At 566, the applicant data host 535 provides the CV instance to the applicant backend 518.

At 568, the applicant backend 518 provides the CV instance to the manager user device 561.

At 570, the manager user views the shared CV instance on the manager user device 561 using the manager CV view.

FIG. 13 illustrates another example view presentation user interface 1300. The view presentation user interface 1300 includes presentation of document instance data using a particular view. For example, as shown by a label 1302, the view presentation user interface 1300 displays CV instance data using a job application view 1304 (e.g., the hiring manager CV view defined using the view definition user interface 1000 as described above with respect to FIG. 10). The view presentation user interface 1300 includes first name 1306, last name 1308, and skills 1310 document instance values, as defined by the underlying view.

Referring now to FIG. 5C, at 572, an HR user records a hiring decision for the job and/or for the job applicant. For example, the hiring decision may be to hire the job applicant, remove the job applicant from consideration for the job, etc. The company may then decide that there is no longer a need to share the CV template with the user. Accordingly, at 574, the HR user device 504 can, in response to a user input from an HR user, send a request to the HR backend 508 to remove sharing of the CV template to the job applicant. At 576, the HR backend 508 can perform one or more actions to remove sharing of (e.g., remove access to) the CV template for the applicant.

As another example, the applicant can decide they are no longer interested in the job, or may receive a notice that they are hired for the position. Accordingly, the applicant can decide that they do not need or want to continue to share the CV instance with the company. At 578, the applicant user device 535 can send a request to the applicant backend 518 to remove sharing of the CV instance to the company. At 580, the applicant backend 518 can perform one or more actions to remove sharing of (e.g., remove access to) the CV instance for the company.

FIG. 14 is a flowchart of an example method for a storage layer abstraction for distributed, self-sovereign content sharing. It will be understood that method 1400 and related methods may be performed, for example, by any suitable system, environment, software, and hardware, or a combination of systems, environments, software, and hardware, as appropriate. For example, one or more of a client, a server, or other computing device can be used to execute method 1400 and related methods and obtain any data from the memory of a client, the server, or the other computing device.

At 1402, a first request is received, at an interface of a storage layer abstraction server, for a first user to upload a first file to a first data host. The first request can include first settings for configuring storage of the first file at the first data host At 1404, a first unique identifier associated with the first file, the first user, and the first data host is generated.

At 1406, first credentials for the first data host are identified in the storage layer abstraction server.

At 1408, a first connection to the first data host is established using the first credentials.

At 1410, the first file is sent, over the first connection, to the first data host for storage at the first data host for the first user.

At 1412, the first unique identifier is provided in response to the first request.

At 1414, a second request is received, at the interface of the storage layer abstraction server, for the first user to upload a second file to a second data host, where the second data host is different than the first data host. The second request can include second settings for configuring storage of the second file at the second data host, where the second settings are different than the first settings. The first settings and the second settings can be different security settings, for example.

Second credentials for the second data host can be identified in the storage layer abstraction server. A second unique identifier associated with the second file, the first user, and the second data host can be generated and a second connection can be established to the second data host using the second credentials. The second file can be sent, over the second connection, to the second data host for storage at the second data host for the first user. The second unique identifier can be provided in response to the second request. The second connection can be established using a protocol that is a different from a protocol used to establish the first connection.

A third request can be received for retrieval of the first file, where the third request includes the first unique identifier but does not include the first credentials. The first credentials for the first data host can be identified in the storage layer abstraction server and used to establish a third connection with the first data host. Contents of the first file can be received from the first data host and provided in response to the third request. The third request can be received from a data-owning user that provided the first request or from a receiving user to which the data-owning user has shared the first file.

FIG. 15 is a flowchart of an example method for document templating for distributed, self-sovereign content sharing. It will be understood that method 1500 and related methods may be performed, for example, by any suitable system, environment, software, and hardware, or a combination of systems, environments, software, and hardware, as appropriate. For example, one or more of a client, a server, or other computing device can be used to execute method 1500 and related methods and obtain any data from the memory of a client, the server, or the other computing device.

At 1502, a document template is received, at a first data-owner server of a first user, that describes document fields that may be included in document instances of the document template.

At 1504, a request is received at the first data-owner server to share the document template with a second user.

At 1506, a first notification that the document template has been shared with the second user by the first user is sent by the first data-owner server and to a second data-owner server of the second user.

At 1508, a first request for the document template is received by the first data-owner server.

At 1510, contents of the document template are provided by the first data-owner server in response to the first request.

At 1512, contents of a first document instance of the document template are received by the first data-owner server and from the second data-owner server. A second notification that the first document instance has been shared with the first user by the second user can be received, at the first data-owner server and from the second data-owner server. A request can be sent to the second data-owner server for the first document instance. The contents of the first document instance can be received, by the first data-owner server and from the second data-owner server, in response to the request to the second data-owner server for the first document instance.

A request can be received at the first data-owner server to stop sharing the document template with the second user. The first data-owner server can be configured in response to the request to stop sharing the document template with the second user. After the request to stop sharing the document template with the second user is received, a request can be received from the second data-owner server for the document template. The request from the second data-owner server for the document template can be denied.

A first view for the document template can be received, at the first data-owner server, that enables viewing, in a first format, a first portion of the document fields of the document template. The first view and a portion of the contents of the first document instance can be provided to a third user to enable the third user to view, in the first format, values from the first document instance of the first portion of the document fields of the document template. A second view for the document template can be received, at the first data-owner server, that enables viewing, in a second format, a second portion of the document fields of the document template, where the second portion is a different portion of the document fields of the document template than the first portion and where the second format is different than the first format. The second view and a portion of the contents of the first document instance can be provided to a fourth user to enable the fourth user to view, in the second format, values from the first document instance of the second portion of the document fields of the document template.

FIG. 16 is a flowchart of an example method for access and authentication for distributed self-sovereign content sharing. It will be understood that method 1600 and related methods may be performed, for example, by any suitable system, environment, software, and hardware, or a combination of systems, environments, software, and hardware, as appropriate. For example, one or more of a client, a server, or other computing device can be used to execute method 1600 and related methods and obtain any data from the memory of a client, the server, or the other computing device. In some implementations, the method 1600 and related methods are executed by one or more components of the system 100 described above with respect to FIG. 1.

At 1602, a request to grant access to a second user to a first file stored at a first data host connected to a first instance of the data sharing server is received at the first instance of a data sharing server and from a first user device of a first user.

At 1604, an authentication token for a second instance of the data sharing server associated with the second user is issued by the first instance of the data sharing server and to the first user device.

At 1606, the authentication token for the second instance of the data sharing server and a notification that the first user has shared the first file with the second user are received at the second instance of the data sharing server and from the first user device.

At 1608, the notification that the first user has shared the first file with the second user is sent by the second instance of the data sharing server and to a second user device of the second user.

At 1610, a request for an authentication token for the first instance of the data sharing server is received at the second instance of the data sharing server and from the second user device.

At 1612, an authentication token for the first instance of the data sharing server is issued by the second instance of the data sharing server and to the second user device.

At 1614, the authentication token for the first instance of the data sharing server and a request for contents of the first file are received at the first instance of the data sharing server and from the second user device.

At 1616, a verification is performed, at the first instance of the data sharing server, that the first file has been shared with the second user.

At 1618, the contents of the first file are retrieved by the first instance of the data sharing server and from the first data host.

At 1620, the contents of the first file are provided to the second user device.

FIG. 17 is a block diagram illustrating an example of a computer-implemented System 1700 used to provide computational functionalities associated with described algorithms, methods, functions, processes, flows, and procedures. In the illustrated implementation, System 1700 includes a Computer 1702 and a Network 1730.

The illustrated Computer 1702 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 1702 can include an input device, such as a keypad, keyboard, or touch screen, or a combination of input devices that can accept user information, and an output device that conveys information associated with the operation of the Computer 1702, including digital data, visual, audio, another type of information, or a combination of types of information, on a graphical-type user interface (UI) (or GUI) or other UI.

The Computer 1702 can serve in a role in a distributed computing system as, for example, a client, network component, a server, or a database or another persistency, or a combination of roles for performing the subject matter described in the present disclosure. The illustrated Computer 1702 is communicably coupled with a Network 1730. In some implementations, one or more components of the Computer 1702 can be configured to operate within an environment, or a combination of environments, including cloud-computing, local, or global.

At a high level, the Computer 1702 is an electronic computing device operable to receive, transmit, process, store, or manage data and information associated with the described subject matter. According to some implementations, the Computer 1702 can also include or be communicably coupled with a server, such as an application server, e-mail server, web server, caching server, or streaming data server, or a combination of servers.

The Computer 1702 can receive requests over Network 1730 (for example, from a client software application executing on another Computer 1702) and respond to the received requests by processing the received requests using a software application or a combination of software applications. In addition, requests can also be sent to the Computer 1702 from internal users (for example, from a command console or by another internal access method), external or third-parties, or other entities, individuals, systems, or computers.

Each of the components of the Computer 1702 can communicate using a System Bus 1703. In some implementations, any or all of the components of the Computer 1702, including hardware, software, or a combination of hardware and software, can interface over the System Bus 1703 using an application programming interface (API) 1712, a Service Layer 1713, or a combination of the API 1712 and Service Layer 1713. The API 1712 can include specifications for routines, data structures, and object classes. The API 1712 can be either computer-language independent or dependent and refer to a complete interface, a single function, or even a set of APIs. The Service Layer 1713 provides software services to the Computer 1702 or other components (whether illustrated or not) that are communicably coupled to the Computer 1702. The functionality of the Computer 1702 can be accessible for all service consumers using the Service Layer 1713. Software services, such as those provided by the Service Layer 1713, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 1702, alternative implementations can illustrate the API 1712 or the Service Layer 1713 as stand-alone components in relation to other components of the Computer 1702 or other components (whether illustrated or not) that are communicably coupled to the Computer 1702. Moreover, any or all parts of the API 1712 or the Service Layer 1713 can be implemented as a child or a sub-module of another software module, enterprise application, or hardware module without departing from the scope of the present disclosure.

The Computer 1702 includes an Interface 1704. Although illustrated as a single Interface 1704, two or more Interfaces 1704 can be used according to particular needs, desires, or particular implementations of the Computer 1702. The Interface 1704 is used by the Computer 1702 for communicating with another computing system (whether illustrated or not) that is communicatively linked to the Network 1730 in a distributed environment. Generally, the Interface 1704 is operable to communicate with the Network 1730 and includes logic encoded in software, hardware, or a combination of software and hardware. More specifically, the Interface 1704 can include software supporting one or more communication protocols associated with communications such that the Network 1730 or hardware of Interface 1704 is operable to communicate physical signals within and outside of the illustrated Computer 1702.

The Computer 1702 includes a Processor 1705. Although illustrated as a single Processor 1705, two or more Processors 1705 can be used according to particular needs, desires, or particular implementations of the Computer 1702. Generally, the Processor 1705 executes instructions and manipulates data to perform the operations of the Computer 1702 and any algorithms, methods, functions, processes, flows, and procedures as described in the present disclosure.

The Computer 1702 also includes a Database 1706 that can hold data for the Computer 1702, another component communicatively linked to the Network 1730 (whether illustrated or not), or a combination of the Computer 1702 and another component. For example, Database 1706 can be an in-memory or conventional database storing data consistent with the present disclosure. In some implementations, Database 1706 can be a combination of two or more different database types (for example, a hybrid in-memory and conventional database) according to particular needs, desires, or particular implementations of the Computer 1702 and the described functionality. Although illustrated as a single Database 1706, two or more databases of similar or differing types can be used according to particular needs, desires, or particular implementations of the Computer 1702 and the described functionality. While Database 1706 is illustrated as an integral component of the Computer 1702, in alternative implementations, Database 1706 can be external to the Computer 1702.

The Computer 1702 also includes a Memory 1707 that can hold data for the Computer 1702, another component or components communicatively linked to the Network 1730 (whether illustrated or not), or a combination of the Computer 1702 and another component. Memory 1707 can store any data consistent with the present disclosure. In some implementations, Memory 1707 can be a combination of two or more different types of memory (for example, a combination of semiconductor and magnetic storage) according to particular needs, desires, or particular implementations of the Computer 1702 and the described functionality. Although illustrated as a single Memory 1707, two or more Memories 1707 or similar or differing types can be used according to particular needs, desires, or particular implementations of the Computer 1702 and the described functionality. While Memory 1707 is illustrated as an integral component of the Computer 1702, in alternative implementations, Memory 1707 can be external to the Computer 1702.

The Application 1708 is an algorithmic software engine providing functionality according to particular needs, desires, or particular implementations of the Computer 1702, particularly with respect to functionality described in the present disclosure. For example, Application 1708 can serve as one or more components, modules, or applications. Further, although illustrated as a single Application 1708, the Application 1708 can be implemented as multiple Applications 1708 on the Computer 1702. In addition, although illustrated as integral to the Computer 1702, in alternative implementations, the Application 1708 can be external to the Computer 1702.

The Computer 1702 can also include a Power Supply 1714. The Power Supply 1714 can include a rechargeable or non-rechargeable battery that can be configured to be either user- or non-user-replaceable. In some implementations, the Power Supply 1714 can include power-conversion or management circuits (including recharging, standby, or another power management functionality). In some implementations, the Power Supply 1714 can include a power plug to allow the Computer 1702 to be plugged into a wall socket or another power source to, for example, power the Computer 1702 or recharge a rechargeable battery.

There can be any number of Computers 1702 associated with, or external to, a computer system containing Computer 1702, each Computer 1702 communicating over Network 1730. Further, the term "client," "user," or other appropriate terminology can be used interchangeably, as appropriate, without departing from the scope of the present disclosure. Moreover, the present disclosure contemplates that many users can use one Computer 1702, or that one user can use multiple computers 1702.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second(s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/-R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

Moreover, the preceding figures and accompanying description illustrate example processes and computer-implementable techniques. But systems described herein (or their software or other components) contemplate using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, systems may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:

receiving, at a first data-owner server of a first user that is included in a decentralized system of data-owner servers of multiple users, and from a first user device of the first user, a document template that describes document fields that may be included in document instances of the document template;

storing the document template at a first data host connected to the first data-owner server;

receiving, at the first data-owner server and from the first user device of the first user, a request to share the document template stored at the first data host with a second user;

issuing, by the first data-owner server and to the first user device, in response to the request from the first user device to share the document template stored at the first data host with the second user, a first authentication token for a second data-owner server of the second user that is included in the decentralized system of data-owner servers to enable the first user device to notify the second data-owner server that the document template has been shared with the second user by the first user;

receiving, by the first data-owner server and from a second user device of the second user, a first request for the document template that includes a second authentication token for the first data-owner server that was generated for the second user by the second data-owner server;

verifying, by the first data-owner server, that the document template has been shared with the second user;

retrieving, by the first data-owner server and from the first data host connected to the first data-owner server, contents of the document template;

providing, by the first data-owner server, in response to the first request, the contents of the document template to the second user device of the second user; and receiving, by the first data-owner server and from the second data-owner server, contents of a first document instance of the document template.

2. The computer-implemented method of claim 1, further comprising receiving, at the first data-owner server, a request to stop sharing the document template with the second user.

3. The computer-implemented method of claim 2, further comprising configuring the first data-owner server in response to the request to stop sharing the document template with the second user.

4. The computer-implemented method of claim 3, further comprising:

receiving, after receiving the request to stop sharing the document template with the second user, a request from the second data-owner server for the document template; and denying the request from the second data-owner server for the document template.

5. The computer-implemented method of claim 1, further comprising receiving, at the first data-owner server, a first view for the document template that enables viewing, in a first format, a first portion of the document fields of the document template.

6. The computer-implemented method of claim 5, further comprising providing the first view and at least a portion of the contents of the first document instance to a third user to enable the third user to view, in the first format, values from the first document instance of the first portion of the document fields of the document template.

7. The computer-implemented method of claim 6, further comprising receiving, at the first data-owner server, a second view for the document template that enables viewing, in a second format, a second portion of the document fields of the document template, wherein the second portion is a different portion of the document fields of the document template than the first portion and wherein the second format is different than the first format.

8. The computer-implemented method of claim 7, further comprising providing the second view and at least a portion of the contents of the first document instance to a fourth user to enable the fourth user to view, in the second format, values from the first document instance of the second portion of the document fields of the document template.

9. The computer-implemented method of claim 1, wherein receiving, by the first data-owner server and from the second data-owner server, contents of the first document instance of the document template comprises:

receiving, at the first data-owner server and from the second data-owner server, a second notification that the first document instance has been shared with the first user by the second user;

sending a request to the second data-owner server for the first document instance; and receiving, by the first data-owner server and from the second data-owner server, the contents of the first document instance, in response to the request to the second data-owner server for the first document instance.

10. A system comprising:

one or more computers; and a computer-readable medium coupled to the one or more computers having instructions stored thereon which, when executed by the one or more computers, cause the one or more computers to perform operations comprising:

receiving, at a first data-owner server of a first user that is included in a decentralized system of data-owner servers of multiple users, and from a first user device of the first user, a document template that describes document fields that may be included in document instances of the document template;

storing the document template at a first data host connected to the first data-owner server;

receiving, at the first data-owner server and from the first user device of the first user, a request to share the document template stored at the first data host with a second user;

issuing, by the first data-owner server and to the first user device, in response to the request from the first user device to share the document template stored at the first data host with the second user, a first authentication token for a second data-owner server of the second user that is included in the decentralized system of data-owner servers to enable the first user device to notify the second data-owner server that the document template has been shared with the second user by the first user;

receiving, by the first data-owner server and from a second user device of the second user, a first request for the document template that includes a second authentication token for the first data-owner server that was generated for the second user by the second data-owner server;

verifying, by the first data-owner server, that the document template has been shared with the second user;

retrieving, by the first data-owner server and from the first data host connected to the first data-owner server, contents of the document template;

providing, by the first data-owner server, in response to the first request, the contents of the document template to the second user device of the second user; and receiving, by the first data-owner server and from the second data-owner server, contents of a first document instance of the document template.

11. The system of claim 10, wherein the operations further comprise receiving, at the first data-owner server, a request to stop sharing the document template with the second user.

12. The system of claim 11, wherein the operations further comprise configuring the first data-owner server in response to the request to stop sharing the document template with the second user.

13. The system of claim 12, wherein the operations further comprise:

receiving, after receiving the request to stop sharing the document template with the second user, a request from the second data-owner server for the document template; and denying the request from the second data-owner server for the document template.

14. The system of claim 10, wherein the operations further comprise receiving, at the first data-owner server, a first view for the document template that enables viewing, in a first format, a first portion of the document fields of the document template.

15. The system of claim 14, wherein the operations further comprise providing the first view and at least a portion of the contents of the first document instance to a third user to enable the third user to view, in the first format, values from the first document instance of the first portion of the document fields of the document template.

16. A computer program product encoded on a non-transitory storage medium, the product comprising non-transitory, computer readable instructions for causing one or more processors to perform operations comprising:

receiving, at a first data-owner server of a first user that is included in a decentralized system of data-owner servers of multiple users, and from a first user device of the first user, a document template that describes document fields that may be included in document instances of the document template;

storing the document template at a first data host connected to the first data-owner server;

receiving, at the first data-owner server and from the first user device of the first user, a request to share the document template stored at the first data host with a second user;

issuing, by the first data-owner server and to the first user device, in response to the request from the first user device to share the document template stored at the first data host with the second user, a first authentication token for a second data-owner server of the second user that is included in the decentralized system of data-owner servers to enable the first user device to notify the second data-owner server that the document template has been shared with the second user by the first user;

receiving, by the first data-owner server and from a second user device of the second user, a first request for the document template that includes a second authentication token for the first data-owner server that was generated for the second user by the second data-owner server;

verifying, by the first data-owner server, that the document template has been shared with the second user;

retrieving, by the first data-owner server and from the first data host connected to the first data-owner server, contents of the document template;

providing, by the first data-owner server, in response to the first request, the contents of the document template to the second user device of the second user; and receiving, by the first data-owner server and from the second data-owner server, contents of a first document instance of the document template.

17. The computer program product of claim 16, wherein the operations further comprise receiving, at the first data-owner server, a request to stop sharing the document template with the second user.

18. The computer program product of claim 17, wherein the operations further comprise configuring the first data-owner server in response to the request to stop sharing the document template with the second user.

19. The computer program product of claim 18, wherein the operations further comprise:

receiving, after receiving the request to stop sharing the document template with the second user, a request from the second data-owner server for the document template; and denying the request from the second data-owner server for the document template.

20. The computer program product of claim 16, wherein the operations further comprise receiving, at the first data-owner server, a first view for the document template that enables viewing, in a first format, a first portion of the document fields of the document template.

* * * * *